United States Patent
Seo et al.

(10) Patent No.: US 10,075,262 B2
(45) Date of Patent: Sep. 11, 2018

(54) METHOD AND APPARATUS FOR TRANSMITTING DOWNLINK CONTROL INFORMATION IN WIRELESS COMMUNICATION SYSTEM

(71) Applicant: LG Electronics Inc., Seoul (KR)

(72) Inventors: Dongyoun Seo, Seoul (KR); Joonkui Ahn, Seoul (KR); Suckchel Yang, Seoul (KR); Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/598,963

(22) Filed: May 18, 2017

(65) Prior Publication Data

US 2017/0257191 A1 Sep. 7, 2017

Related U.S. Application Data

(63) Continuation of application No. 14/650,513, filed as application No. PCT/KR2013/011834 on Dec. 18, 2013.

(Continued)

(51) Int. Cl.
*H04B 7/155* (2006.01)
*H04L 1/18* (2006.01)
(Continued)

(52) U.S. Cl.
CPC ....... *H04L 1/1822* (2013.01); *H04B 7/15557* (2013.01); *H04L 1/1854* (2013.01);
(Continued)

(58) Field of Classification Search
CPC . H04B 7/15557; H04B 7/2615; H04L 5/0055; H04L 1/1854; H04L 1/1812; H04L 1/1822; H04W 84/025; H04W 74/006; H04W 74/004; H04W 74/002; H04W 48/12; H04W 16/32
See application file for complete search history.

(56) References Cited

U.S. PATENT DOCUMENTS 8,036,491 B2 10/2011 Matsui et al.
8,817,673 B2 8/2014 Li et al.
(Continued)

FOREIGN PATENT DOCUMENTS

CN 101288247 A 10/2008
CN 101631374 A 1/2010
(Continued)

OTHER PUBLICATIONS

Fujitsu et al., "DC1 format padding in LTE," R1-111719, 3GPP TSG RAN WG1#65, Barcelona, Spain, May 9-13, 2011, see p. 2, lines 23-26, and p. 4, line 28, p. 5, line 30.
(Continued)

*Primary Examiner* — Ayaz Sheikh
*Assistant Examiner* — Debebe Asefa
(74) *Attorney, Agent, or Firm* — Dentons US LLP

(57) ABSTRACT

Provided are a method and an apparatus for transmitting downlink control information in a wireless communication system configured with a plurality of serving cells. The method generates downlink control information scheduling frequency division duplex (FDD) cells by means of FDD frames (DCI_FDD) and downlink control information scheduling time division duplex (TDD) cells by means of TDD frames (DCI_TDD), and transmits the DCI_FDD and the DCI_TDD, wherein parts of the fields of DCI_FDD and DCI_TDD are generated to have equal bit sizes, and if the FDD or TDD cell is used exclusively, then said parts of the fields in the FDD and TDD cells have mutually different bit sizes.

16 Claims, 21 Drawing Sheets

Related U.S. Application Data

(60) Provisional application No. 61/896,015, filed on Oct. 25, 2013, provisional application No. 61/882,004, filed on Sep. 25, 2013, provisional application No. 61/738,394, filed on Dec. 18, 2012.

(51) Int. Cl.

| | | |
|---|---|---|
| *H04W 74/02* | (2009.01) | |
| *H04W 16/32* | (2009.01) | |
| *H04L 5/00* | (2006.01) | |
| *H04W 4/02* | (2018.01) | |
| *H04W 74/00* | (2009.01) | |
| *H04W 48/12* | (2009.01) | |
| *H04W 84/02* | (2009.01) | |

(52) U.S. Cl.
CPC .......... *H04L 5/0055* (2013.01); *H04W 16/32* (2013.01); *H04W 48/12* (2013.01); *H04W 74/002* (2013.01); *H04W 74/004* (2013.01); *H04W 74/006* (2013.01); *H04L 1/1812* (2013.01); *H04W 84/025* (2013.01)

(56) References Cited

U.S. PATENT DOCUMENTS

| | | |
|---|---|---|
| 8,923,273 B2 | 12/2014 | Seo et al. |
| 9,055,568 B2 | 6/2015 | Yang et al. |
| 2010/0304689 A1 | 12/2010 | McBeath et al. |
| 2011/0310820 A1 | 12/2011 | Liao |
| 2012/0257519 A1 | 10/2012 | Frank .................... H04L 5/0035 370/252 |
| 2012/0257552 A1* | 10/2012 | Chen .................... H04W 72/94 |
| 2012/0269140 A1 | 10/2012 | Nam et al. |
| 2013/0039231 A1 | 2/2013 | Wang |
| 2014/0334359 A1 | 11/2014 | Yin et al. |
| 2015/0304074 A1* | 10/2015 | Seo .................... H04W 74/002 |

FOREIGN PATENT DOCUMENTS

| | | |
|---|---|---|
| CN | 102316526 A | 1/2012 |
| CN | 102625456 A | 8/2012 |
| CN | 102651680 A | 8/2012 |
| JP | 2012512613 | 5/2012 |
| KR | 1020110003584 A | 1/2011 |
| KR | 1020120055731 | 5/2012 |
| KR | 1021020105458 | 9/2012 |
| WO | 2012109195 A2 | 8/2012 |

OTHER PUBLICATIONS

Li, et al.: "Control Channel Design for Carrier Aggregation between LTE FDD and LTE TDD Systems", XP032202278, 2012 IEEE 75th Vehicular Technology Conference, Yokohama, Japan, May 6-9, 2012, pp. 1-5.

* cited by examiner

METHOD AND APPARATUS FOR TRANSMITTING DOWNLINK CONTROL INFORMATION IN WIRELESS COMMUNICATION SYSTEM

This application is a continuation application of U.S. patent application Ser. No. 14/650,513 filed on Jun. 8, 2015, and claims benefit of 35 USC § 371 National Stage entry of International Application No. PCT/KR2013/011834 filed on Dec. 18, 2013, and claims priority to U.S. Provisional Application Nos. 61/738,394 filed on Dec. 18, 2012; 61/882,004 filed on Sep. 25, 2013 and 61/896,015 filed on Oct. 25, 2013, all of which are hereby incorporated by reference in their entireties as if fully set forth herein.

BACKGROUND OF THE INVENTION

Field of the Invention

The present invention relates to wireless communications, and more particularly, to a method and apparatus for transmitting downlink control information in a wireless communication system in which serving cells using different types of radio frames are aggregated.

Related Art

Long Term Evolution (LTE) based on $3^{rd}$ Generation Partnership Project (3GPP) Technical Specification (TS) Release 8 is the leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUSCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR).

Meanwhile, 3GPP LTE-Advanced (A) that is the evolution of 3GPP LTE is in progress. Technology introduced into 3GPP LTE-A includes a carrier aggregation.

A carrier aggregation uses a plurality of component carriers. A component carrier is defined by the center frequency and a bandwidth. One downlink component carrier or a pair of an uplink component carrier and a downlink component carrier correspond to one cell. It can be said that a terminal being served using a plurality of downlink component carriers is being served from a plurality of serving cells.

Meanwhile, in the next-generation wireless communication system, a serving cell using time division duplex (TDD) and a serving cell using frequency division duplex (FDD) can be aggregated. That is, a plurality of serving cells using different types of radio frames can be allocated to a terminal.

Meanwhile, downlink control information has a predetermined format. That is, which fields are included in the downlink control information is predetermined, and the number of bits of each field is also predetermined. However, according to whether the same downlink control information format is used for TDD or for FDD, there is a field included or not included in the downlink control information format. Further, there is a field of which the number of bits varies depending on whether it is used for TDD/FDD even if the field is included irrespective of TDD/FDD.

How to effectively configure a format of downlink control information may be a matter to be considered in a wireless communication system in which serving cells using different radio frame structures are aggregated.

SUMMARY OF THE INVENTION

The present invention provides a method and apparatus for transmitting downlink control information in a wireless communication system in which a plurality of serving cells using different types of radio frames are aggregated.

In one aspect, a method of transmitting downlink control information (DCI) in a wireless communication system in which a plurality of serving cells are configured is provided. The method includes generating DCI for scheduling frequency division duplex (FDD) cells using FDD frames (DCI_FDD) and DCI for scheduling time division duplex (TDD) cells using TDD frames (DCI_TDD), and transmitting the DCI_FDD and the DCI_TDD. Some fields of the DCI_FDD and DCI_TDD are generated to have the same bit size, and if the FDD or TDD cell is used exclusively, the some fields are fields having different bit sizes in the FDD cell and the TDD cell.

In another aspect, an apparatus is provided. The apparatus includes a radio frequency (RF) unit for transmitting and receiving a radio signal and a processor operatively coupled to the RF unit. The processor is configured for generating DCI for scheduling frequency division duplex (FDD) cells using FDD frames (DCI_FDD) and DCI for scheduling time division duplex (TDD) cells using TDD frames (DCI_TDD), and transmitting the DCI_FDD and the DCI_TDD. Some fields of the DCI_FDD and DCI_TDD are generated to have the same bit size, and if the FDD or TDD cell is used exclusively, the some fields are fields having different bit sizes in the FDD cell and the TDD cell.

In a wireless communication system in which a plurality of serving cells using different types of radio frames are aggregated, a terminal can effectively decode downlink control information by applying the same downlink control information format for scheduling a time division duplex (TDD) cell or a frequency division duplex (FDD) cell.

BRIEF DESCRIPTION OF THE DRAWINGS

FIG. 6 shows a structure of a DCI format used in FDD.
FIG. 7 shows a structure of a DCI format used in TDD.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
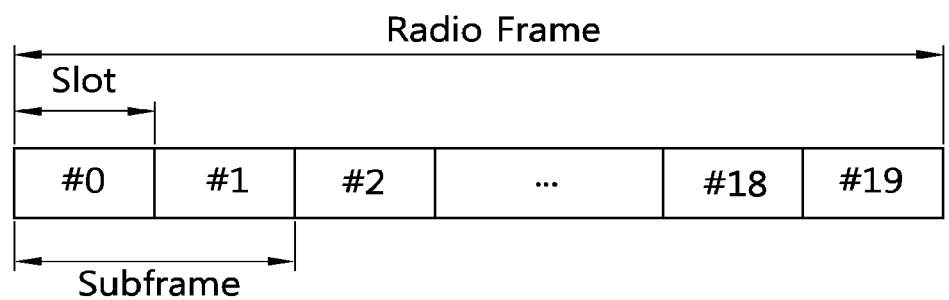
FIG. 1 shows the structure of an FDD radio frame.

FIG. 1 shows the structure of an FDD radio frame.

The FDD radio frame includes 10 subframes, and one subframe includes two consecutive slots. The slots within the radio frame are assigned indices 0~19. The time that is taken for one subframe to be transmitted is called a Transmission Time Interval (TTI). A TTI can be a minimum scheduling unit. For example, the length of one subframe can be 1 ms, and the length of one slot can be 0.5 ms. Hereinafter, the FDD radio frame may be simply referred to as an FDD frame.

Figure 2:
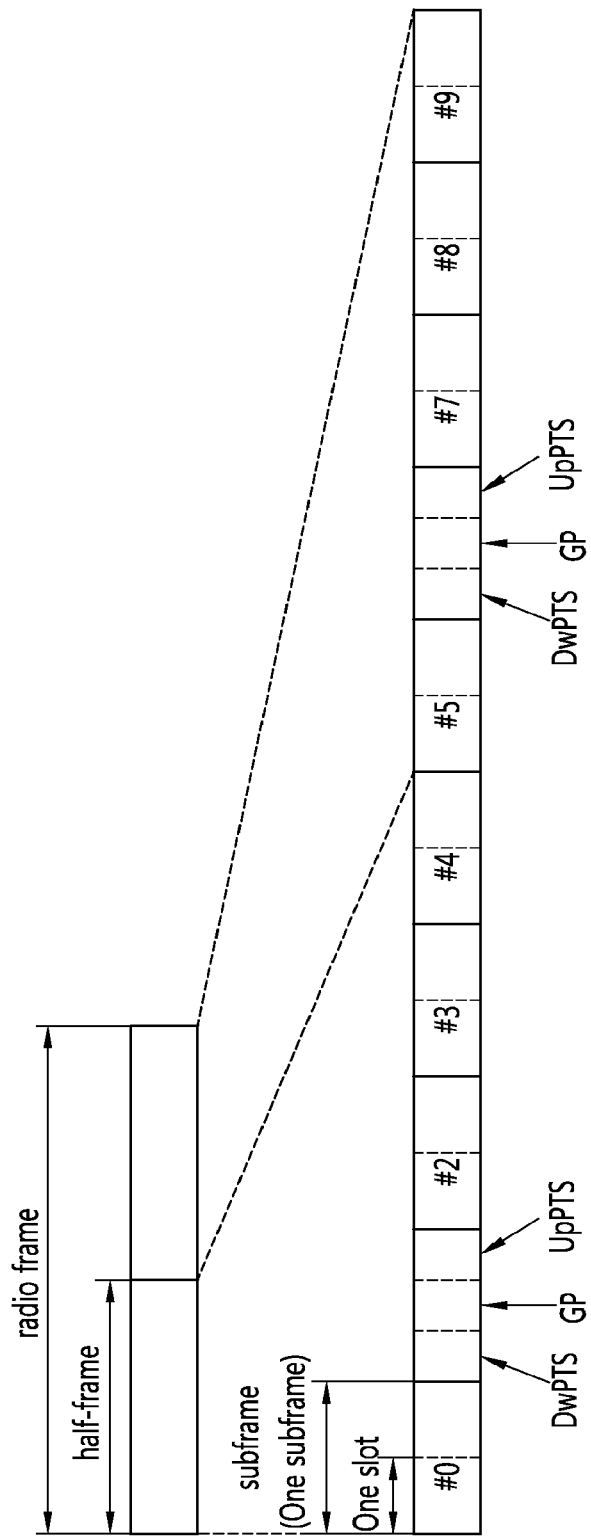
FIG. 2 shows the structure of a TDD radio frame.

FIG. 2 shows the structure of a TDD radio frame.

Referring to FIG. 2, a downlink (DL) subframe and an uplink (UL) subframe coexist in a TDD radio frame used in TDD. Table 1 shows an example of a UL-DL configuration of the radio frame.

TABLE 1

| Uplink-downlink configuration | Downlink-to-uplink switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' indicates a DL subframe, 'U' indicates a UL subframe, and 'S' indicates a special subframe. When a UL-DL configuration is received from a BS, a UE can be aware of whether each subframe in a radio frame is a DL subframe or a UL subframe. Hereinafter, reference can be made to Table 1 for a UL-DL configuration N (N is any one of 0 to 6).

In the TDD frame, a subframe having an index #1 and an index #6 may be a special subframe, and includes a downlink pilot time slot (DwPTS), a guard period (GP), and an uplink pilot time slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed. Hereinafter, the TDD radio frame may be simply referred to as a TDD frame.

Figure 3:
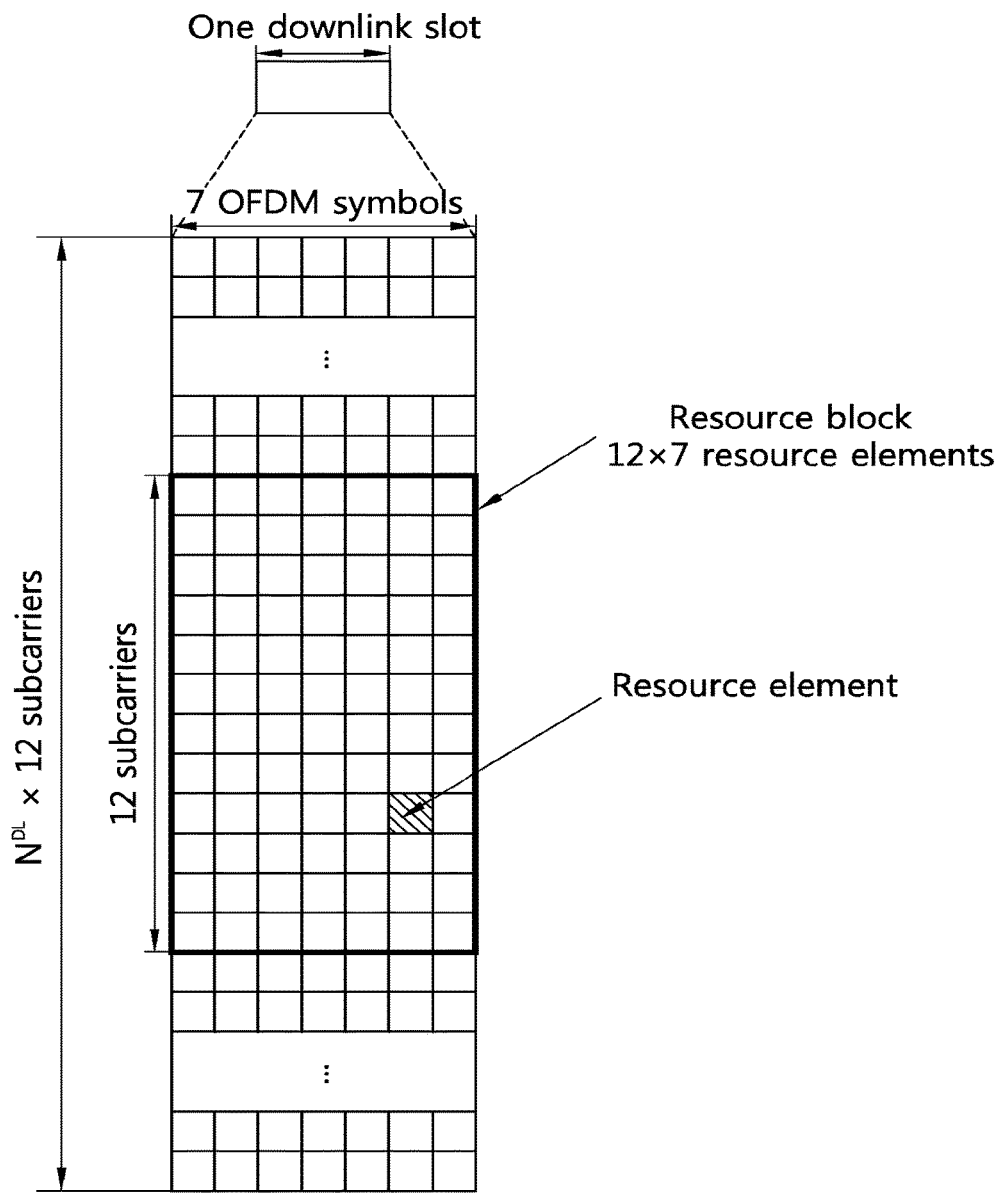
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
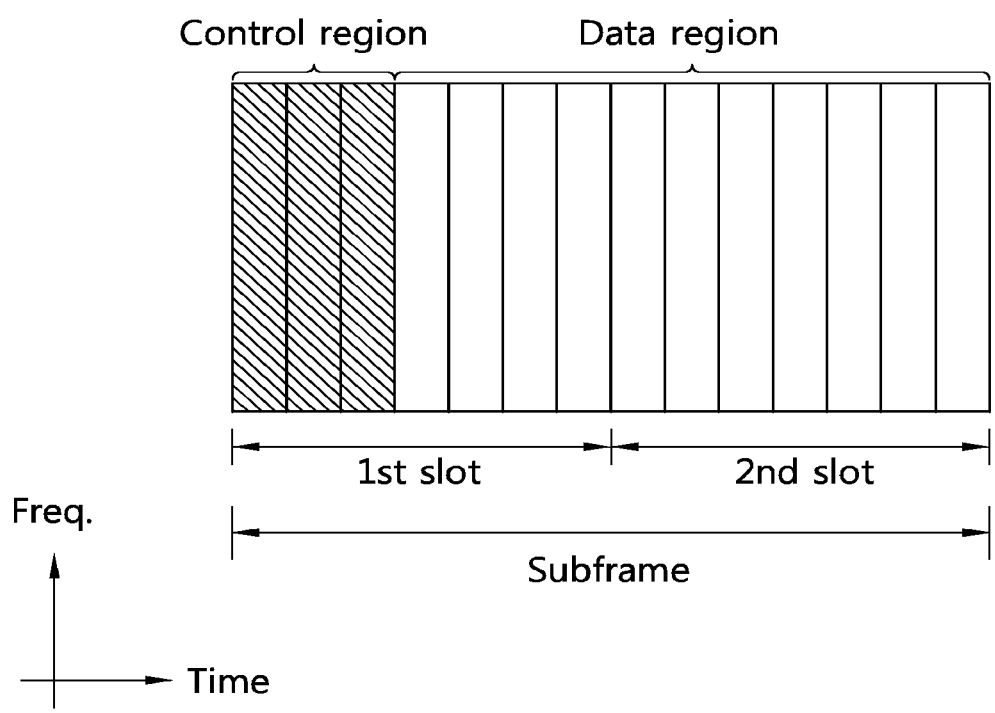
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximun 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP). The DCI has several formats, which will be described below.

The control region in the subframe includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements (REs). According to the relationship between the number of CCEs and a coding rate provided by the CCEs, a PDCCH format and a possible PDCCH bit number are determined.

One REG includes four REs, and one CCE includes 9 REGs. In order to configure one PDCCH, {1, 2, 4, 8} CCE may be used. Each element of {1, 2, 4, 8} refers to a CCE aggregation level.

The number of CCEs used to transmit the PDDCH is determined by the BS according to a channel state.

Figure 5:
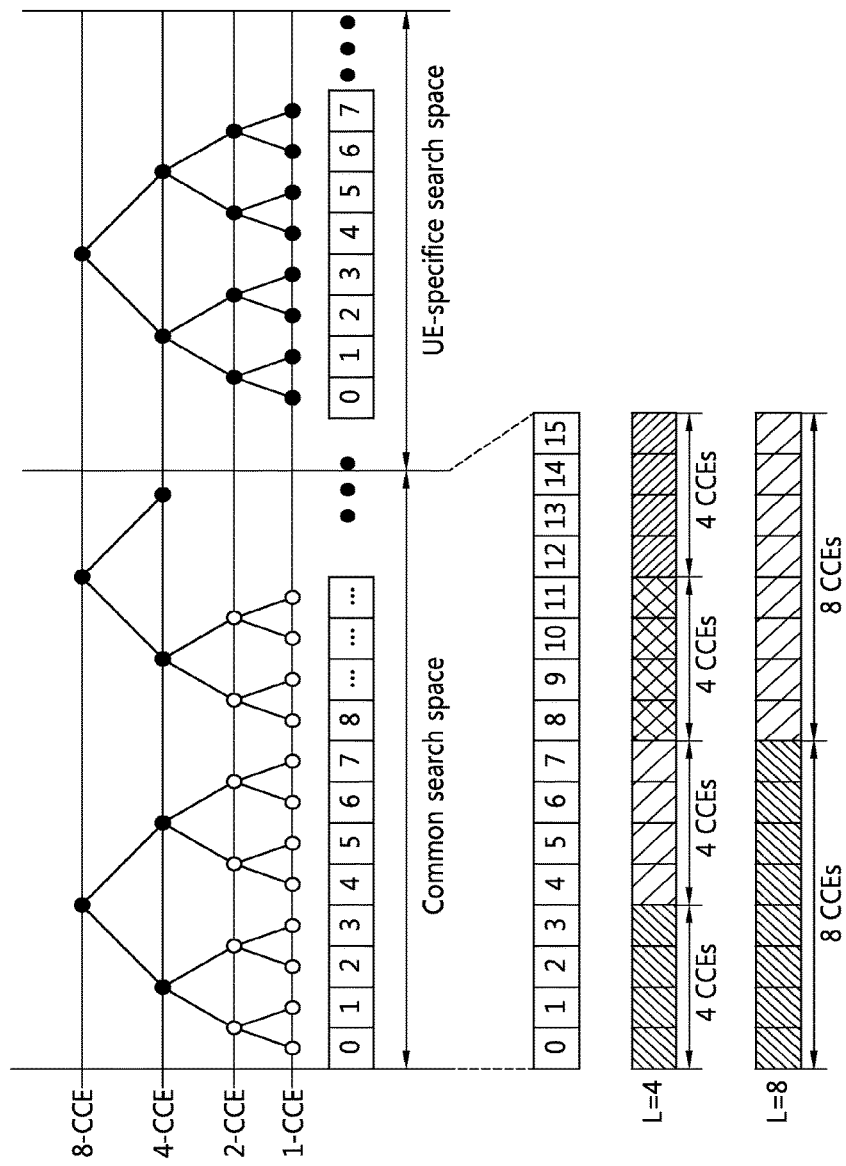
FIG. 5 shows an example of monitoring of a PDCCH.

FIG. 5 shows an example of monitoring of a PDCCH.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A UE cannot know about a specific position in a control region in which its PDCCH is transmitted and about a specific CCE aggregation or DCI format used for PDCCH transmission.

A plurality of PDCCHs may be transmitted in one subframe. The UE monitors the plurality of PDCCHs in every subframe. Herein, monitoring is an operation of attempting PDCCH decoding by the UE according to a format of the monitored PDCCH.

The 3GPP LTE uses a search space to reduce a blind decoding overhead. The search space may also be called a monitoring set of a CCE for the PDCCH. The UE monitors the PDCCH in the search space.

The search space is classified into a common search space (CSS) and a UE-specific search space (USS). The CSS is a space for searching for a PDCCH having common control information and consists of 16 CCEs having CCE indices 0 to 15, and supports a PDCCH having a CCE aggregation level of {4, 8}. However, a PDCCH (e.g., DCI formats 0, 1A) for carrying UE-specific information may also be transmitted in the CSS. The USS supports a PDCCH having a CCE aggregation level of {1, 2, 4, 8}.

A start point of the search space is defined differently in the CSS and the USS. Although a start point of the CSS is fixed irrespective of a subframe, a start point of the USS may vary in every subframe according to a UE identifier (e.g., C-RNTI), a CCE aggregation level, and/or a slot number in a radio frame. If the start point of the USS exists in the CSS, the USS and the CSS may overlap with each other.

Now, the existing DCI formats transmitted on a PDCCH are described.

Figure 6:
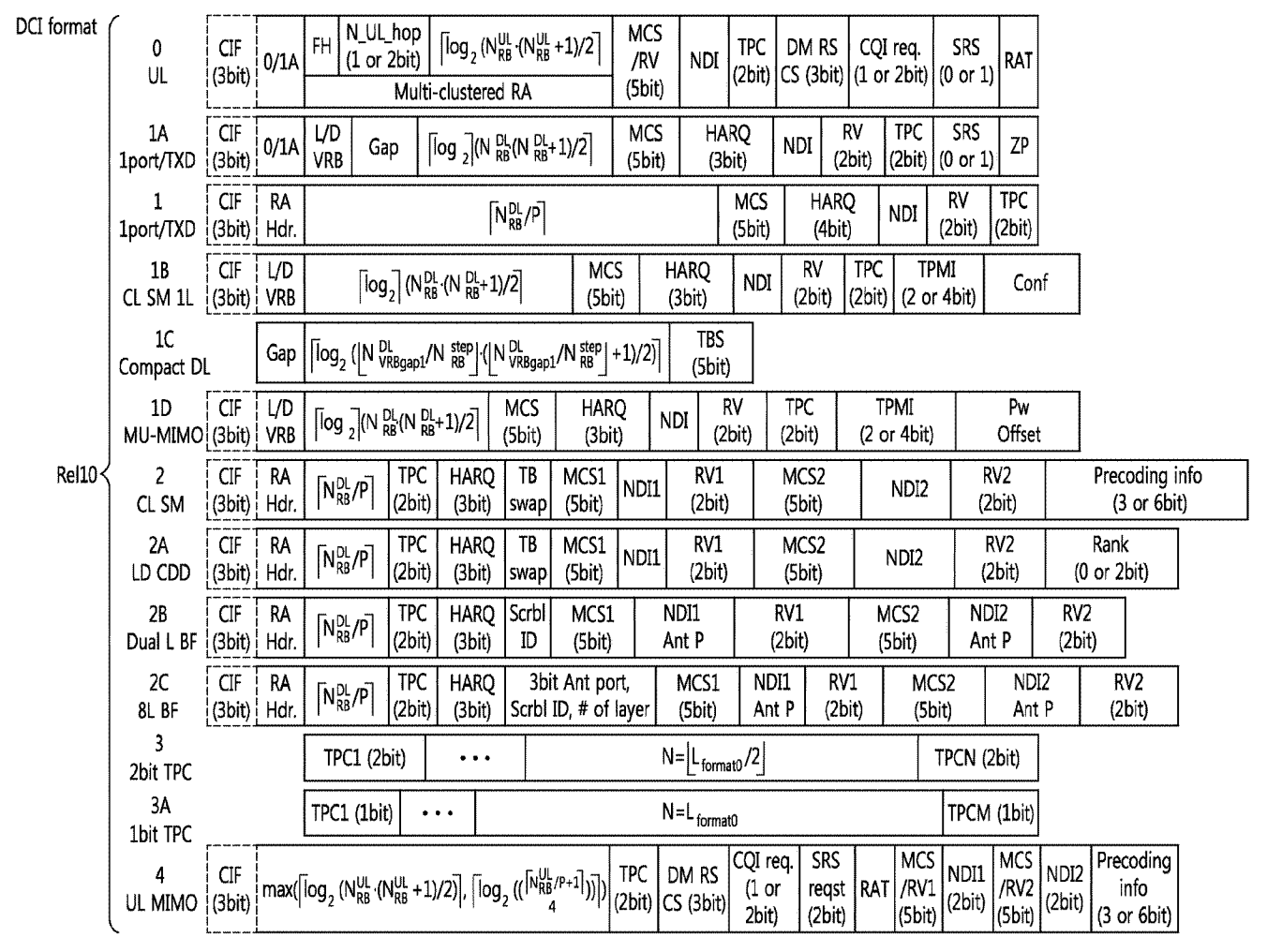
Figure 7:
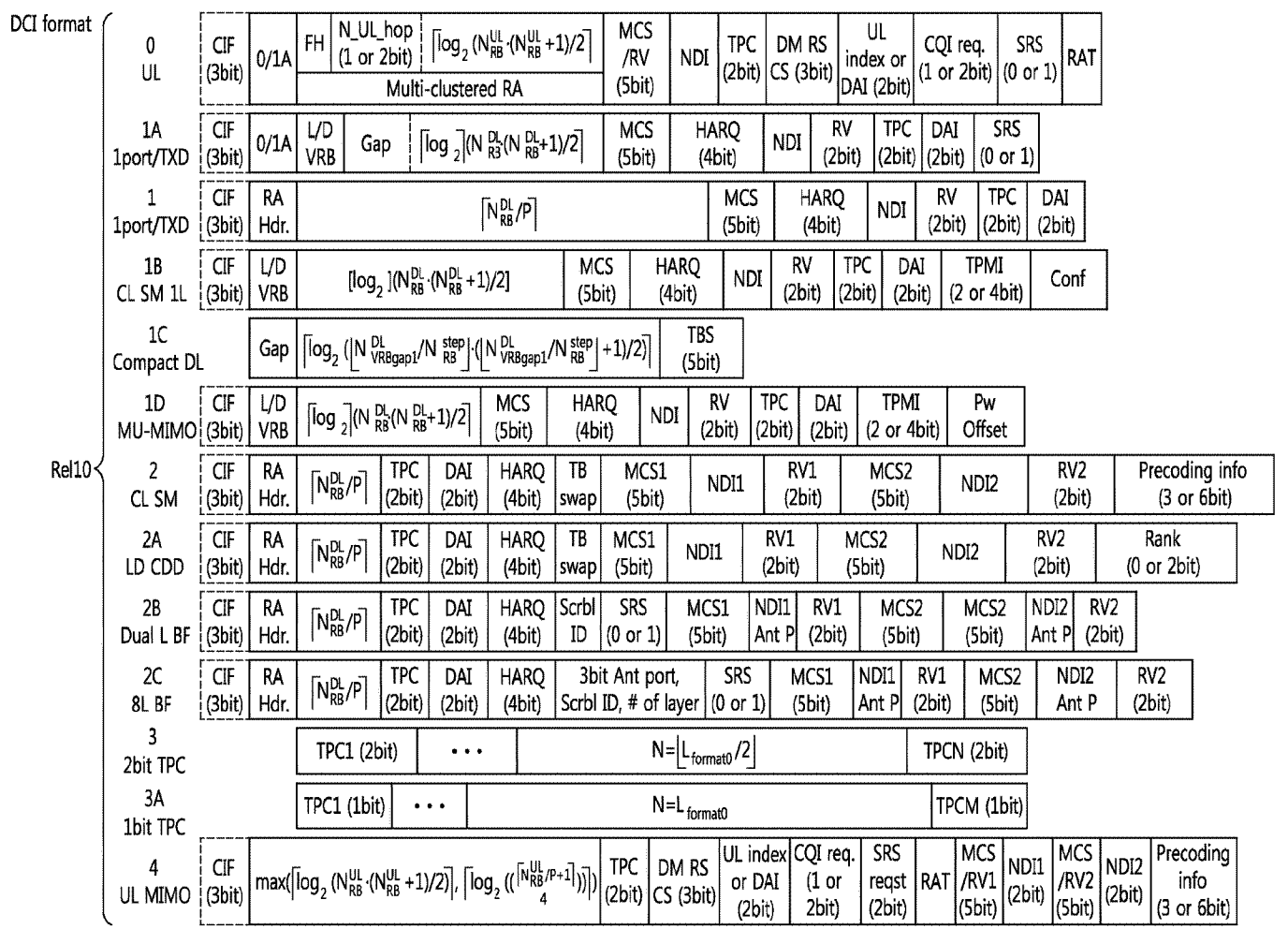

FIG. 6 shows a structure of a DCI format used in FDD, and FIG. 7 shows a structure of a DCI format used in TDD. In FIGS. 6 and 7, a DCI format #A is simply denoted by #A.

Referring to FIG. 6 and FIG. 7, a DCI format includes fields described below, and the respective fields may be mapped to information bits $a_0$ to $a_{A-1}$. The respective fields may be mapped in the same order as described in the respective DCI formats. Each field may have zero-padding bits. A first field may be mapped to an information bit $a_0$ having a lowest order, and consecutive other fields may be mapped to information bits having higher orders. In each field, a most significant bit (MSB) may be mapped to an information bit having a lowest order of a corresponding field. For example, an MSB of the first field may be mapped to $a_0$. Hereinafter, a set of fields included in the respective existing DCI formats is called an information field.

1. DCI Format 0

The DCI format 0 is used for PUSCH scheduling in one UL cell. Examples of information (field) transmitted by using the DCI format 0 are as follows.

1) a carrier indicator field (hereinafter, CIF) which may consist of 0 to 3 bits, 2) a flag for identifying the DCI format 0 and a DCI format 1A (if the flag is 0, it indicates the DCI format 0, and if the flag is 1, it indicates the DCI format 1A), 3) a frequency hopping flag (1 bit), 4) a resource block designation and a hopping resource allocation, 5) a modulation and coding scheme and a redundancy version (5 bits), 6) a new data indicator (1 bit), 7) a TPC command (2 bits) for a scheduled PUSCH, 8) a cyclic shift (3 bits) for DM-RS and an orthogonal cover code (OCC) index (3 bits), 9) a UL index (2 bits), 10) a downlink designation index (only in a TDD), 11) a CSI request, 12) a sounding reference signal (SRS) request (this field exists only in DCI formats for scheduling a PUSCH, mapped to a USS), 13) a resource allocation type (this field exists only when the number of resource blocks allocated to a downlink is greater than or equal to the number of resource blocks allocated to an uplink), etc. If the number of information bits in the DCI format 0 is less than a payload size of the DCI format 1A, zero padding is performed so that the payload size is equal to the payload size of the DCI format 1A.

2. DCI Format 1

The DCI format 1 is used for one PDSCH codeword scheduling in one cell. Examples of information transmitted in the DCI format 1 are as follows.

1) a carrier indicator field (0 or 3 bits), 2) a resource allocation header (indicating a resource allocation type 0/type 1)—if a DL bandwidth is less than 10 PRBs, the resource allocation header is not included and the resource allocation type 0 is assumed. 3) a resource block designation, 4) a modulation and coding scheme (5 bits), 5) an HARQ process number (3 bits in FDD, 4 bits in TDD), 6) a new data indicator (1 bit), 7) a redundancy version (2 bits), 8) a TPC command for a PUCCH (2 bits), 9) a downlink designation index (DAI) (2 bits, only in a TDD), etc. If the number of information bits of the DCI format 1 is equal to that of the DCI formats 0/1A, one bit having a value of '0' is added to the DCI format 1. If the number of information bits in the DCI format 1 is equal to any one of {12, 14, 16, 20, 24, 26, 32, 40, 44, 56}, a bit having one or more values of '0' is added to the DCI format 1 so that it is different from {12, 14, 16, 20, 24, 26, 32, 40, 44, 56} and a payload size is different from that of the DCI formats 0/1A.

3. DCI Format 1A

The DCI format 1A is used for compact scheduling of one PDSCH codeword in one cell or a random access process caused by a PDCCH command. DCI corresponding to the PDCCH command may be delivered through a PDCCH or an enhanced PDCCH (EPDCCH).

Examples of information transmitted in the DCI format 1A are as follows. 1) a carrier indicator field (0 or 3 bits), 2) a flag for identifying the DCI format 0 and the DCI format 1A (1 bit), 3) a localized/distributed VRB designation flag (1 bit), 4) a resource block designation, 5) a preamble index (6 bits), 6) a physical random access channel (PRACH) mask index (4 bits), 7) a modulation and coding scheme (5 bits), 8) an HARQ process number (3 bits), 9) a new data indicator (1 bit), 10) a redundancy version (2 bits), 11) a TPC command for a PUCCH (2 bits), 12) a DAI (2 bits, only in a TDD), 13) an SRS request (0 or 1 bits), 14) an HARQ-ACK resource offset (2 bits). etc. If the number of information bits of the DCI format 1A is less than the number of information bits of the DCI format 0, bits having a value of '0' are added so that it has the same size as the payload size of the DCI format 0. If the number of information bits in the DCI format 1A is equal to any one of {12, 14, 16, 20, 24, 26, 32, 40, 44, 56}, a bit having one value of '0' is added to the DCI format 1A.

4. DCI Format 1B

The DCI format 1B includes precoding information and is used for compact scheduling for one PDSCH codeword of one cell. Examples of information transmitted in the DCI format 1B are as follows.

1) a carrier indicator field (0 or 3 bits), 2) a localized/distributed VRB designation flag (1 bit), 3) a resource block designation, 4) a modulation and coding scheme (5 bits), 5) an HARQ process number (3 bits), 6) a new data indicator (1 bit), 7) a redundancy version (2 bits), 8) a TPC command for a PUCCH (2 bits), 9) a DAI (2 bits, only in a TDD), 10) transmitted precoding matrix indicator (TPMI) information for precoding, 11) a PMI confirmation for precoding (1 bit), etc. If the number of information bits in the DCI format 1B is equal to any one of {12, 14, 16, 20, 24, 26, 32, 40, 44, 56}, a bit having one value of '0' is added to the DCI format 1B.

5. DCI Format 1C

The DCI format 1C is used for very compact scheduling for one PDSCH codeword and multicast control channel (MCCH) change reporting. In the former case, examples of information transmitted in the DCI format 1C are as follows. 1) an indicator indicating a gap value (1 bits), 2) a resource block designation, 3) a modulation and coding scheme. In the latter case, examples of information transmitted in the DCI format 1C are as follows. 1) information for MCCH change reporting (8 bits), 2) reserved information bits, etc.

6. DCI Format 1D

The DCI format 1D includes precoding and power offset information and is used for compact scheduling for one PDSCH codeword of one cell.

Examples of information transmitted in the DCI format 1D are as follows.

1) a carrier indicator field (0 or 3 bits), 2) a localized/distributed VRB designation flag (1 bit), 3) a resource block designation, 4) a modulation and coding scheme (5 bits), 5) an HARQ process number (3 bits in FDD, 4 bits in TDD), 6) a new data indicator (1 bit), 7) a redundancy version (2 bits), 8) a TPC command for a PUCCH (2 bits), 9) a DAI (2 bits, only in a TDD), 10) TPMI information for precoding, 11) a downlink power offset (1 bit), 12) an HARQ-ACK resource offset (2 bits), etc. If the number of information bits in the DCI format 1D is equal to any one of {12, 14, 16, 20, 24, 26, 32, 40, 44, 56}, a bit having one value of '0' is added to the DCI format 1D.

7. DCI Format 2

The DCI format 2 is used to designate a PDSCH for a close-loop MIMO operation. Examples of information transmitted in the DCI format 2 are as follows.

1) a carrier indicator field (0 or 3 bits), 2) a resource allocation header (1 bit), 3) a resource block designation, 4) a TPC command for a PUCCH (2 bits), 5) a DAI (2 bits, only in a TDD), 6) an HARQ process number (3 bits in FDD, 4 bits n TDD), 7) a transport block to codeword swap flag (1 bit), 8) a modulation and coding scheme (5 bits), 9) a new data indicator (1 bit), 10) a redundancy version (2 bits), 11) precoding information, 12) an HARQ-ACK resource offset, etc. The information 8) to the information 10) may be given for each transport block.

8. DCI Format 2A

The DCI format 2A is used to designate a PDSCH for an open-loop MIMO operation. Examples of information transmitted in the DCI format 2A are as follows.

1) a carrier indicator field (0 or 3 bits), 2) a resource allocation header (1 bit), 3) a resource block designation, 4) a TPC command for a PUCCH (2 bits), 5) a DAI (2 bits, only in a TDD), 6) an HARQ process number (3 bits in FDD, 4 bits n TDD), 7) a transport block to codeword swap flag (1 bit), 8) a modulation and coding scheme (5 bits), 9) a new data indicator (1 bit), 10) a redundancy version (2 bits), 11) precoding information, 12) an HARQ-ACK resource offset, etc.

9. DCI Format 2B

Examples of information transmitted in the DCI format 2B are as follows.

1) a carrier indicator field (0 or 3 bits), 2) a resource allocation header (1 bit), 3) a resource block designation, 4) a TPC command for a PUCCH (2 bits), 5) a DAI (2 bits, only in a TDD), 6) an HARQ process number (3 bits in FDD, 4 bits n TDD), 7) a scrambling identity (ID) (1 bit), 8) an SRS request (0 or 1 bit), 9) a modulation and coding scheme (5 bits), 10) a new data indicator (1 bit), 11) a redundancy version (2 bits), 12) an HARQ-ACK resource offset, etc.

10. DCI Format 2C

Examples of information transmitted in the DCI format 2C are as follows.

1) a carrier indicator field (0 or 3 bits), 2) a resource allocation header (1 bit), 3) a resource block designation, 4) a TPC command for a PUCCH (2 bits), 5) a DAI (2 bits, only in a TDD), 6) an HARQ process number (3 bits in FDD, 4 bits n TDD), 7) an antenna port, a scrambling ID, and the number of layers (3 bits), 8) an SRS request (0 or 1 bit), 9) a modulation and coding scheme (5 bits), 10) a new data indicator (1 bit), 11) a redundancy version (2 bits), 12) an HARQ-ACK resource offset, etc.

11. DCI Format 2D

Examples of information transmitted in the DCI format 2D are as follows.

1) a carrier indicator field (0 or 3 bits), 2) a resource allocation header (1 bit), 3) a resource block designation, 4) a TPC command for a PUCCH (2 bits), 5) a DAI (2 bits, only in a TDD), 6) an HARQ process number (3 bits in FDD, 4 bits n TDD), 7) an antenna port, a scrambling ID, and the number of layers (3 bits), 8) an SRS request (0 or 1 bit), 9) a modulation and coding scheme (5 bits), 10) a new data indicator (1 bit), 11) a redundancy version (2 bits), 12) a PDSCH resource element mapping and quasi-co-location indicator, 13) an HARQ-ACK resource offset, etc.

12. DCI Format 3

The DCI format 3 is used to transmit a TPC command for a PUCCH and a PUSCH through 2-bit power regulation. N transmit power control (TPC) commands may be transmitted in the DCI format 3.

13. DCI Format 3A

The DCI format 3A is used to transmit a TPC command for a PUCCH and a PUSCH through 1-bit power regulation. M TPC commands may be transmitted in the DCI format 3A.

14. DCI Format 4

The DCI format 4 is used for scheduling of a PUSCH in one UL cell having a multi-antenna port transmission mode, and examples of information transmitted in the DCI format 4 are as follows.

1) a carrier indicator field (0 or 3 bits), 2) a resource block designation, 3) a TPC command for a PUCCH (2 bits), 4) a cyclic shift for DM RS and an OCC index (3 bits), 5) a UL index (2 bits), 6) a DAI (2 bits, only in a TDD), 7) a CSI request 1 or 2 bits), 8) an SRS request (2 bits), 9) a resource allocation type (1 bit), 10) a modulation and coding scheme (5 bits), 11) a new data indicator (1 bit), 12) precoding information and the number of layers, etc.

Figure 8:
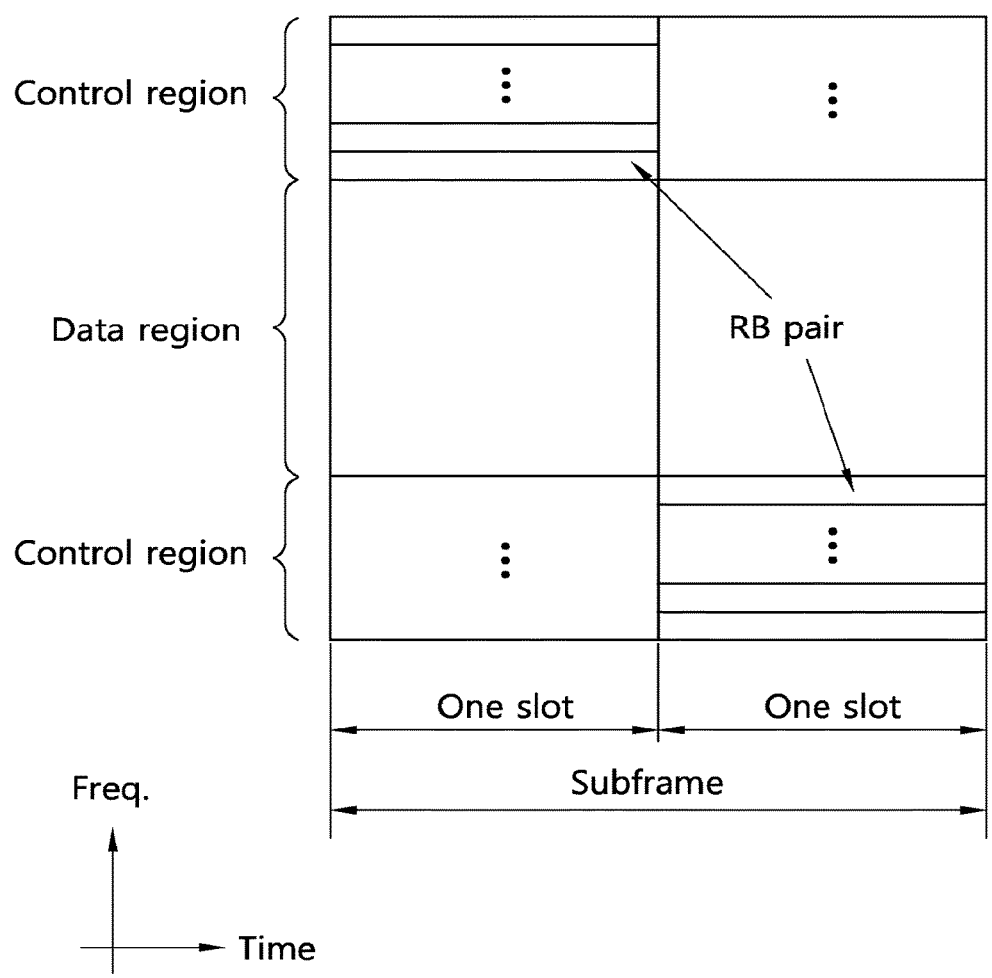
FIG. 8 shows the structure of an UL subframe.
Figure 9:
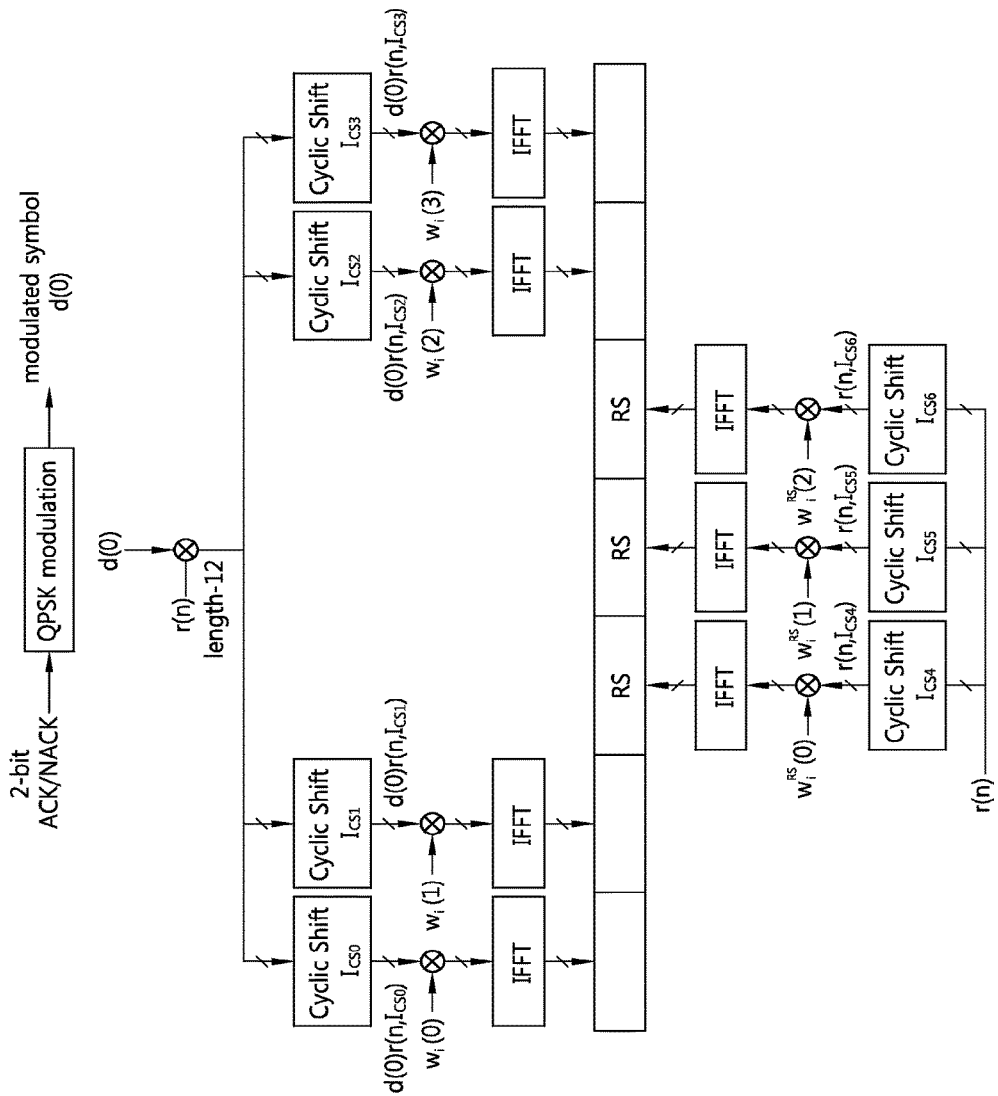
FIG. 9 shows the channel structure of a PUCCH format 1b in a normal CP.

FIG. 8 shows the structure of an UL subframe.

Referring to FIG. 8, the UL subframe can be divided into a control region to which a physical uplink control channel (PUSCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index in.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. In this case, the ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n) = e^{jb(n)\pi/4} \quad \text{[Equation 1]}$$

Here, u is a root index, n is an element index wherein $0 \le n \le N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc.

Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence r(n) as in Equation 2.

$$r(n, I_{cs}) = r(n) \cdot \exp\left(\frac{j2\pi I_{cs} n}{N}\right), \quad \text{[Equation 2]}$$
$$0 \le I_{cs} \le N-1$$

Here, $I_{cs}$ is a CS index indicative of a CS amount $(0 \le I_{cs} \le N-1)$.

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

FIG. 6 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1b, a modulation symbol d(0) is generated by performing Quadrature Phase Shift Keying (QPSK) modulation on an encoded 2-bit ACK/NACK signal.

A CS index $I_{cs}$ can vary depending on a slot number 'ns' within a radio frame and/or a symbol index 'l' within a slot.

In a normal CP, 4 data OFDM symbols for sending an ACK/NACK signal are present in one slot. It is assumed that corresponding CS indices in respective data OFDM symbols are $I_{cs0}$, $I_{cs1}$, $I_{cs2}$, and $I_{cs3}$.

The modulation symbol d(0) is spread into a CS sequence r(n,Ics). Assuming that a 1-dimensional spread sequence corresponding to an $(i+1)^{th}$ OFDM symbol is m(i) in a slot, {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}can be obtained.

In order to increase a UE capacity, the 1-dimensional spread sequence can be spread using an orthogonal sequence. The following sequence is used as an orthogonal sequence $w_i(k)$ (i is a sequence index, $0 \le k \le K-1$) wherein a spreading factor K=4.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \le k \le K-1$) wherein a spreading factor K=3.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used in each slot.

Accordingly, assuming that a specific orthogonal sequence index i is given, 2-dimensional spread sequences {s(0), s(1), s(2), s(3)} can be expressed as follows.

{s(0),s(1),s(2),s(3)}={$w_i(0)$m(0),$w_i(1)$m(1),$w_i(2)$m(2), $w_i(3)$m(3)}

The 2-dimensional spread sequences {s(0), s(1), s(2), s(3)} are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences r(n,$I_{cs4}$), r(n,$I_{cs5}$), r(n,$I_{cs6}$) can be obtained. The 3 CS sequences are spread into an orthogonal sequence $w^{RS}_i(k)$ wherein K=3.

An orthogonal sequence index i, a CS index $I_{cs}$, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH} = n_{CCE} + N^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 10:
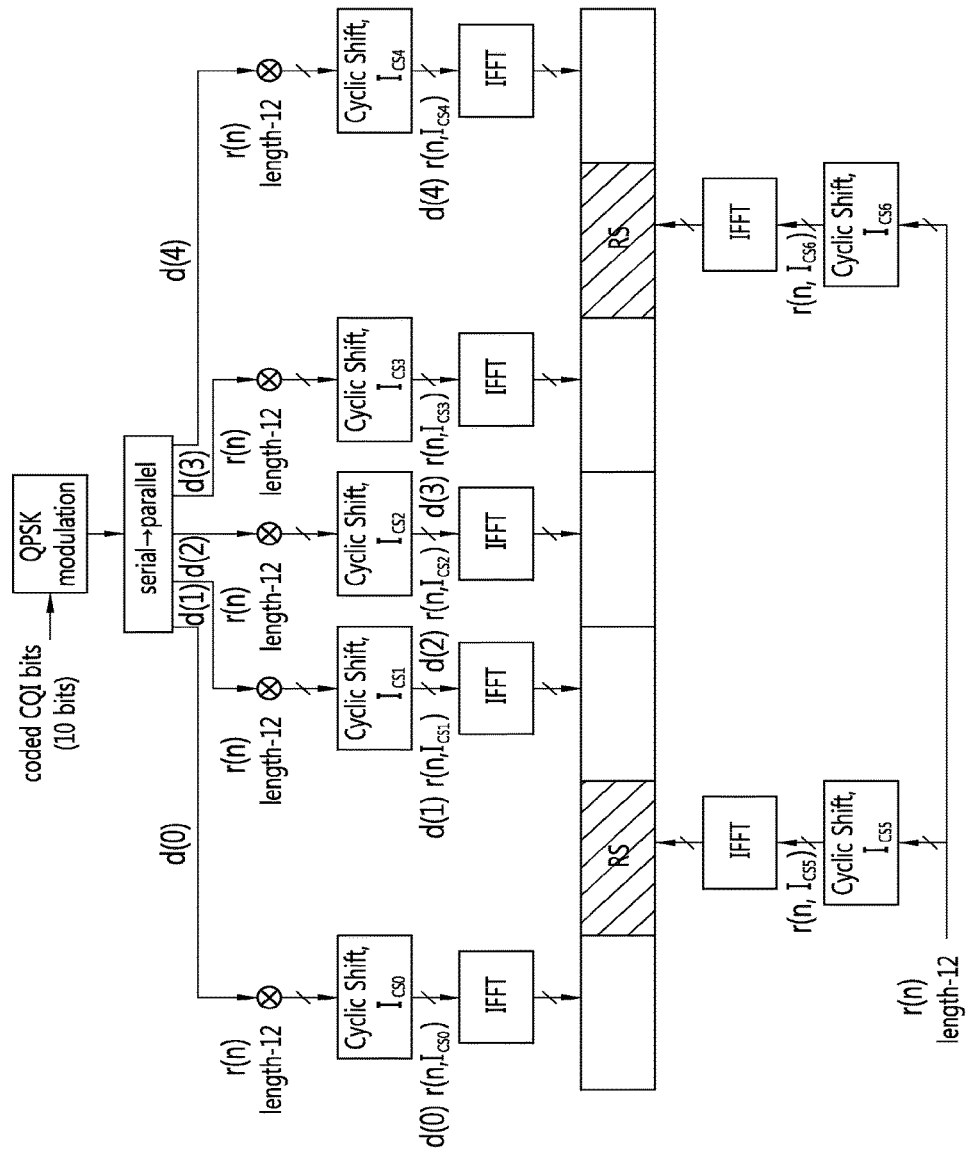
FIG. 10 shows the channel structure of PUCCH formats 2/2a/2b in a normal CP.

FIG. 10 shows the channel structure of the PUCCH formats 2/2a/2b in a normal CP.

Referring to FIG. 10, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

10 CQI information bits can be subject to channel coding at a 1/2 code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CSs enable 12 different MSs to be orthogonally multiplexed in the same PUCCH RB. A base RS sequence 'r(n)' having a length of 12 can be used as a DM RS sequence applied to OFDM symbols 1 and 5.

Figure 11:
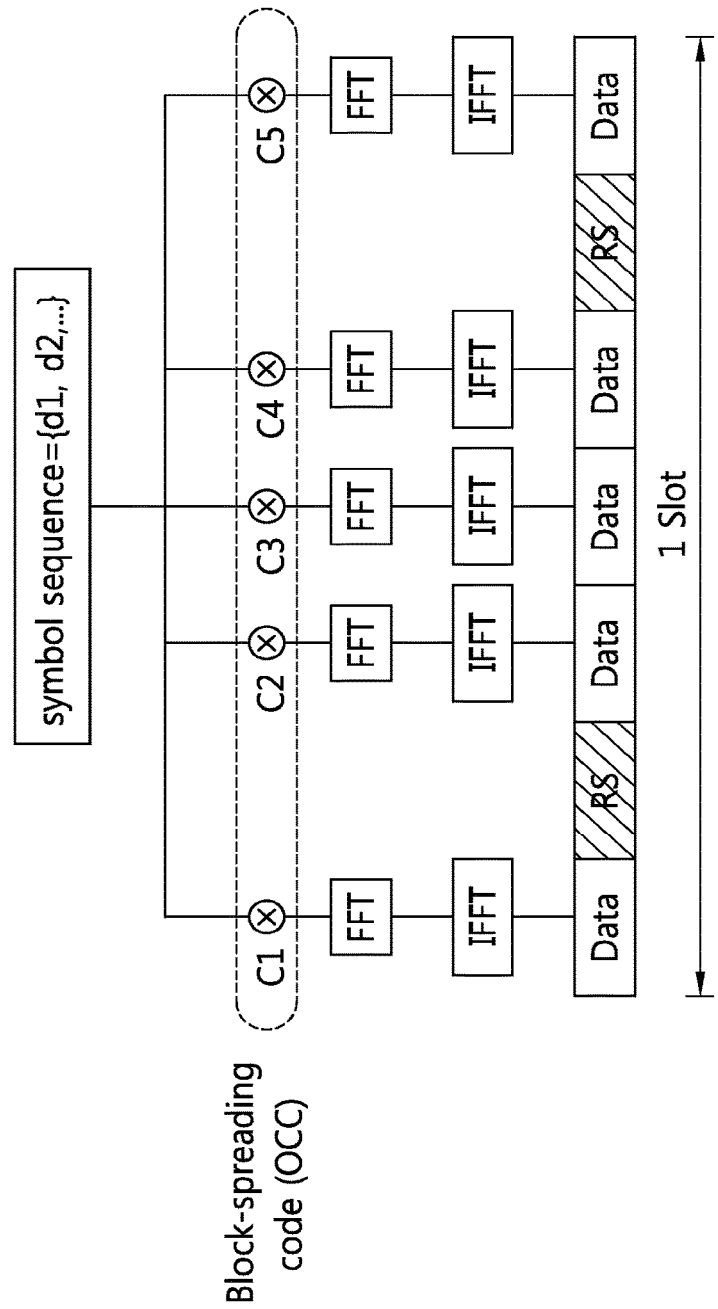
FIG. 11 illustrates the channel structure of a PUCCH format 3.

FIG. 11 shows an example of a channel structure of a PUCCH format 3.

Referring to FIG. 11, the PUCCH format 3 is a PUCCH format which uses a block spreading scheme. The block spreading scheme means a method of spreading a symbol sequence, which is obtained by modulating a multi-bit ACK/NACK, in a time domain by using a block spreading code.

In the PUCCH format 3, a symbol sequence (e.g., ACK/NACK symbol sequence) is transmitted by being spread in the time domain by using the block spreading code. An orthogonal cover code (OCC) may be used as the block spreading code. Control signals of several UEs may be multiplexed by the block spreading code. In the PUCCH format 2, a symbol (e.g., d(0), d(1), d(2), d(3), d(4), etc., of FIG. 7) transmitted in each data symbol is different, and UE multiplexing is performed using the cyclic shift of a constant amplitude zero auto-correlation (CAZAC) sequence. In contrast, in the PUCCH format 3, a symbol sequence including one or more symbols is transmitted in a frequency domain of each data symbol, the symbol sequence is spread in a time domain by using the block spreading code, and UE multiplexing is performed. An example in which 2 RS symbols are used in one slot has been illustrated in FIG. 11, but the present invention is not limited thereto. 3 RS symbols may be used, and an OCC having a spreading factor value of 4 may be used. An RS symbol may be generated from a CAZAC sequence having a specific cyclic shift and may be transmitted in such a manner that a plurality of RS symbols in the time domain has been multiplied by a specific OCC.

Now, a carrier aggregation system is described. The carrier aggregation system is also called a multiple carrier system.

A 3GPP LTE system supports a case where a DL bandwidth and a UL bandwidth are differently configured, but one component carrier (CC) is a precondition in this case. A 3GPP LTE system supports a maximum of 20 MHz and may be different in a UL bandwidth and a DL bandwidth, but supports only one CC in each of UL and DL.

A carrier aggregation (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth may be supported.

Figure 12:
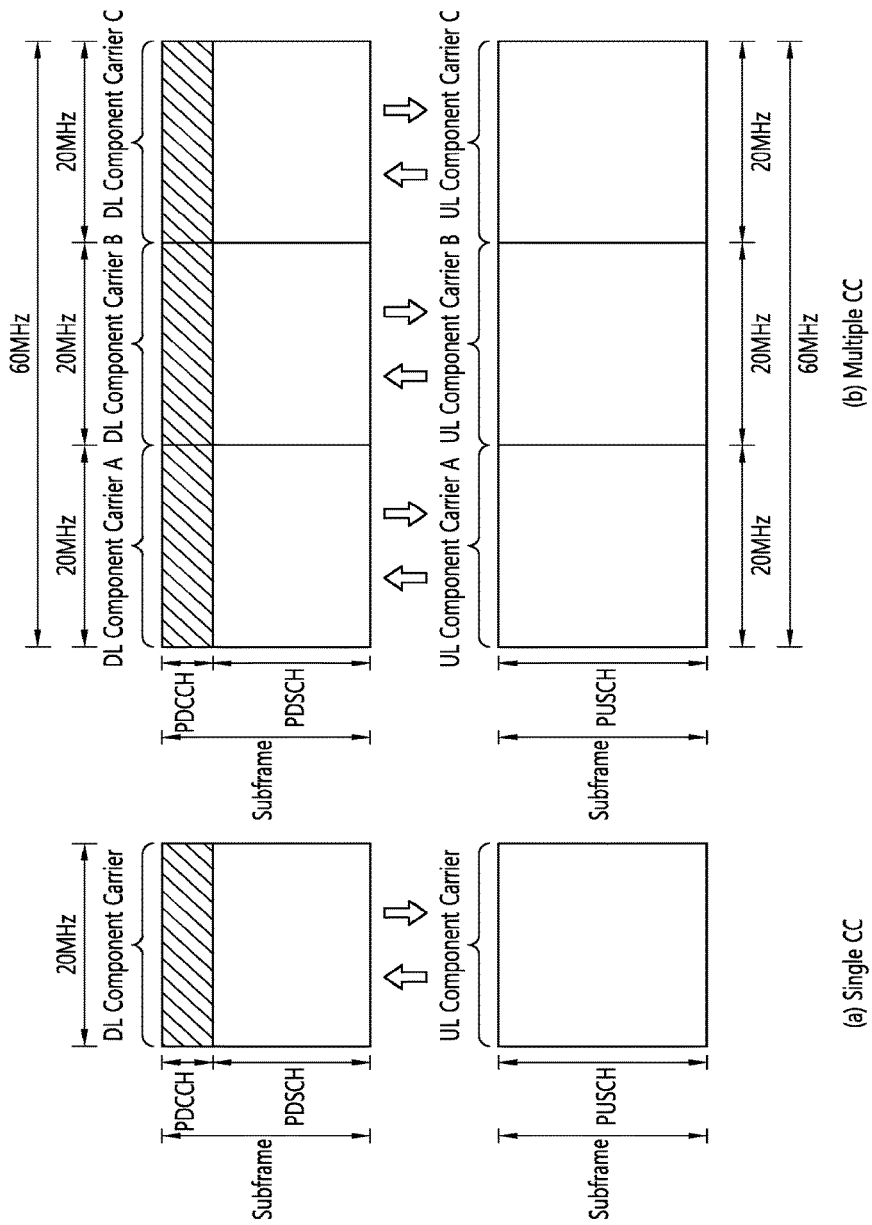
FIG. 12 shows an example of a comparison between a single carrier system and a carrier aggregation system.

FIG. 12 shows an example of a comparison between a single carrier system and a carrier aggregation system.

A carrier aggregation system (FIG. 12(b)) has been illustrated as including three DL CCs and three UL CCs, but the number of DL CCs and UL CCs is not limited. A PDCCH and a PDSCH may be independently transmitted in each DL CC, and a PUCCH and a PUSCH may be independently transmitted in each UL CC. Or, a PUCCH may be transmitted only through a specific UL CC.

Since three pairs of DL CCs and UL CCs are defined, it can be said that a UE is served from three serving cells.

The UE may monitor PDCCHs in a plurality of DL CCs and receive DL transport blocks through the plurality of DL CCs at the same time. The UE may send a plurality of UL transport blocks through a plurality of UL CCs at the same time.

A pair of a DL CC #A and a UL CC #A may become a first serving cell, a pair of a DL CC #B and a UL CC #B may become a second serving cell, and a DL CC #C and a UL CC#C may become a third serving cell. Each serving cell may be identified by a cell index (CI). The CI may be unique within a cell or may be UE-specific.

The serving cell may be divided into a primary cell and a secondary cell. The primary cell is a cell on which the UE performs an initial connection establishment procedure or initiates a connection re-establishment procedure, or a cell designated as a primary cell in a handover process. The primary cell is also called a reference cell. The secondary cell may be configured after an RRC connection has been established and may be used to provide additional radio resources. At least one primary cell is always configured, and a secondary cell may be added/modified/released in response to higher layer signaling (e.g., an RRC message). The CI of the primary cell may be fixed. For example, the lowest CI may be designated as the CI of the primary cell.

The primary cell includes a downlink primary component carrier (DL PCC) and an uplink PCC (UL PCC) in view of a CC. The secondary cell includes only a downlink secondary component carrier (DL SCC) or a pair of a DL SCC and a UL SCC in view of a CC.

As described above, the carrier aggregation system may support a plurality of CCs, that is, a plurality of serving cells unlike the single carrier system.

Such a carrier aggregation system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carriers except for a component carrier fundamentally linked with the specific component carrier. That is, the PDCCH and the PDSCH may be transmitted through different DL CCs, and a PUSCH may be transmitted through a UL CC different from a UL CC linked with a DL CC to which a PDCCH including a UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

The carrier aggregation system for supporting the cross-carrier scheduling may include a carrier indicator field (CIF). In the system for supporting the cross-carrier scheduling, for example, an LTE-A system, since a CIF is added to an existing DCI format (that is, a DCI format used in an LTE), the number of bits may be further extended by 3 bits, and a PDCCH structure may reuse an existing coding method, a resource allocation method (that is, CCE based resource mapping), etc.

A BS may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the BS transmits a PDCCH with respect to a PDSCH/PUSCH to be scheduled through only the DL CCs included in the PDCCH monitoring DL CC group. The PDCCH monitoring DL CC group may be configured in a UE-specific, UE group-specific, or cell-specific manner.

Non-cross carrier scheduling (NCSS) is a scheduling method capable of performing resource allocation of a PDSCH transmitted through a specific component carrier through a PDCCH transmitted through the specific component carrier and/or resource allocation of a PDSCH transmitted through a component carrier fundamentally linked with the specific component carrier.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009-05), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

Table below shows DL subframes n–k associated with an UL subframe n according to an UL-DL configuration in 3GPP LTE, wherein k∈K and M is the number of elements of a set K.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It is assumed that M DL subframes are associated with the UL subframe n and, for example, M=3. In this case, UE can obtain 3 PUCCH resources $n^{(1)}_{PUCCH,0}$, $n^{(1)}_{PUCCH,1}$, and $n^{(1)}_{PUCCH,2}$ because it can receive 3 PDCCHs from 3 DL subframes. In this case, an example of ACK/NACK channel selection is the same as the following table.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the above table, HARQ-ACK(i) indicates ACK/NACK for an $i^{th}$ DL subframe of M DL subframes. Discontinuous transmission (DTX) means that a DL transport block has not been received on a PDSCH in a corresponding DL subframe or that a corresponding PDCCH has not been detected. In accordance with Table 6, 3 PUCCH resources $n^{(1)}_{PUCCH,0}$, $n^{(1)}_{PUCCH,1}$, and $n^{(1)}_{PUCCH,2}$ are present, and b(0), b(1) are two bits transmitted using a selected PUCCH.

For example, when UE successfully receives all 3 DL transport blocks in 3 DL subframes, the UE performs QPSK modulation on bits (1,1) using $n^{(1)}_{PUCCH,2}$ and sends them on a PUCCH. If UE fails in decoding a DL transport block in a first (i=0) DL subframe, but succeeds in decoding the remaining transport blocks, the UE sends bits (1,0) on a PUCCH using $n^{(1)}_{PUCCH,2}$. That is, in the existing PUCCH format 1b, only ACK/NACK of 2 bits can be transmitted. However, in channel selection, allocated PUCCH resources are linked to an actual ACK/NACK signal in order to indicate more ACK/NACK states. This channel selection is also referred to as channel selection using the PUCCH format 1b.

In ACK/NACK channel selection, if at least one ACK is present, NACK and DTX are coupled. This is because all ACK/NACK states cannot be represented by a combination of reserved PUCCH resources and a QPSK symbol. If ACK is not present, however, DTX is decoupled from NACK.

The above-described ACK/NACK bundling and ACK/NACK multiplexing can be applied in the case where one serving cell has been configured in UE in TDD.

For example, it is assumed that one serving cell has been configured (i.e., only a primary cell is configured) in UE in TDD, ACK/NACK bundling or ACK/NACK multiplexing is used, and M=1. That is, it is assumed that one DL subframe is associated with one UL subframe.

1) UE sends ACK/NACK in a subframe n if the UE detects a PDSCH indicated by a corresponding PDCCH in a subframe n-k of a primary cell or detects a Semi-Persistent Scheduling (SPS) release PDCCH. In LTE, a BS can inform UE that semi-persistent transmission and reception are performed in what subframes through a higher layer signal, such as Radio Resource Control (RRC). Parameters given by the higher layer signal can be, for example, the periodicity of a subframe and an offset value. When the UE receives the activation or release signal of SPS transmission through a PDCCH after recognizing semi-persistent transmission through the RRC signaling, the UE performs or releases SPS PDSCH reception or SPS PUSCH transmission. That is, the UE does not immediately perform SPS transmission/reception although SPS scheduling is allocated thereto through the RRC signaling, but when an activation or release signal is received through a PDCCH, performs SPS transmission/reception in a subframe that corresponds to frequency resources (resource block) according to the allocation of the resource block designated by the PDCCH, modulation according to MCS information, a subframe periodicity allocated through the RRC signaling according to a code rate, and an offset value. Here, a PDCCH that releases SPS is called an SPS release PDCCH, and a DL SPS release PDCCH that releases DL SPS transmission requires the transmission of an ACK/NACK signal.

Here, in the subframe n, UE sends ACK/NACK using the PUCCH formats 1a/1b according to a PUCCH resource $n^{(1,p)}_{PUCCH}$. In $n^{(1,p)}_{PUCCH}$, p indicates an antenna port p. The k is determined by Table 5.

The PUCCH resource $n^{(1,p)}_{PUCCH}$ can be allocated as in the following equation. P can be p0 or p1.

$$n^{(1,p=p0)}_{PUCCH} = (M-m-1) \cdot N_c + m \cdot N_{c+1} + n_{CCE} + N^{(1)}_{PUCCH} \text{ for antenna port } p=p0,$$

$$n^{(1,p=p1)}_{PUCCH} = (M-m-1) \cdot N_c + m \cdot N_{c+1} + (n_{CCE}+1) + N^{(1)}_{PUCCH} \text{ for antenna port } p=p1, \quad \text{[Equation 3]}$$

In Equation 3, c is selected in such a way as to satisfy $N_c \leq n_{CCE} < N_{c+1}$ (antenna port p0), $N_c \leq (n_{CCE}+1) < N_{c+1}$ (antenna port p1) from among {0,1,2,3}. $N^{(1)}_{PUCCH}$ is a value set by a higher layer signal. $N_c = \max\{0, \text{floor } [N^{DL}_{RB} \cdot (N^{RB}_{sc} \cdot c - 4)/36]\}$. The $N^{DL}_{RB}$ is a DL bandwidth, and $N^{RB}_{sc}$ is the size of an RB indicated by the number of subcarriers in the frequency domain. $n_{CCE}$ is a first CCE number used to send a corresponding PDCCH in a subframe n-km. m is a value that makes km the smallest value in the set K of Table 5.

2) If UE detects an SPS PDSCH, that is, a PDSCH not including a corresponding PDCCH, in the DL subframe n-k of a primary cell, the UE can send ACK/NACK in the subframe n using the PUCCH resource $n^{(1,p)}_{PUCCH}$ as follows.

Since an SPS PDSCH does not include a scheduling PDCCH, UE sends ACK/NACK through the PUCCH formats 1a/1b according to $n^{(1,p)}_{PUCCH}$ that is configured by a higher layer signal. For example, 4 resources (a first PUCCH resource, a second PUCCH resource, a third PUCCH resource, and a fourth PUCCH resource) can be reserved through an RRC signal, and one resource can be indicated through the Transmission Power Control (TPC) field of a PDCCH that activates SPS scheduling.

The following table is an example in which resources for channel selection are indicated by a TPC field value.

TABLE 7

| TPC field value | Resource for channel selection |
| --- | --- |
| '00' | First PUCCH resource |
| '01' | Second PUCCH resource |
| '10' | Third PUCCH resource |
| '11' | Fourth PUCCH resource |

For another example, it is assumed that in TDD, one serving cell is configured (i.e., only a primary cell is configured) in UE, ACK/NACK multiplexing is used, and M>1. That is, it is assumed that a plurality of DL subframes is associated with one UL subframe.

1) A PUCCH resource $n^{(1)}_{PUCCH,i}$ for sending ACK/NACK when UE receives a PDSCH in a subframe n−$k_i$ (0≤i≤M−1) or detects a DL SPS release PDCCH can be allocated as in the following equation. Here, $k_i \in K$, and the set K has been described with reference to Table 5.

$$n^{(1)}_{PUCCH,i}=(M-i-1)\cdot N_c+i\cdot N_{c+1}+n_{CCE,i}+N^{(1)}_{PUCCH} \quad \text{[Equation 4]}$$

Here, c is selected from {0,1,2,3} so that $N_c \leq n_{CCE,i} < N_{c+1}$ is satisfied. $N^{(1)}_{PUCCH}$ is a value set by a higher layer signal. $N_c=\max\{0, \text{floor}[N^{DL}_{RB}\cdot(N^{RB}_{sc}\cdot c-4)/36]\}$. The $N^{DL}_{RB}$ is a DL bandwidth, and $N^{RB}_{sc}$ is the size of an RB indicated by the number of subcarriers in the frequency domain. $n_{CCE,i}$ is a first CCE number used to send a corresponding PDCCH in the subframe n−$k_i$.

2) If UE receives a PDSCH (i.e., SPS PDSCH) not having a corresponding PDCCH in the subframe, $n^{(1)}_{PUCCH,i}$ is determined by a configuration given by a higher layer signal and Table 7.

If two or more serving cells have been configured in UE in TDD, the UE sends ACK/NACK using channel selection that uses the PUCCH format 1b or the PUCCH format 3. Channel selection that uses the PUCCH format 1b used in TDD can be performed as follows.

If a plurality of serving cells using channel selection that uses the PUCCH format 1b has been configured, when ACK/NACK bits are greater than 4 bits, UE performs spatial ACK/NACK bundling on a plurality of codewords in one DL subframe and sends spatially bundled ACK/NACK bits for each serving cell through channel selection that uses the PUCCH format 1b. Spatial ACK/NACK bundling means the compression of ACK/NACK for each codeword through logical AND operations within the same DL subframe.

If ACK/NACK bits are 4 bits or lower, spatial ACK/NACK bundling is not used and the ACK/NACK bits are transmitted through channel selection that uses the PUCCH format 1b.

If 2 or more serving cells using the PUCCH format 3 have been configured in UE, when ACK/NACK bits are greater than 20 bits, spatial ACK/NACK bundling can be performed in each serving cell and ACK/NACK bits subjected to spatial ACK/NACK bundling can be transmitted through the PUCCH format 3. If ACK/NACK bits are 20 bits or lower, spatial ACK/NACK bundling is not used and the ACK/NACK bits are transmitted through the PUCCH format 3.

<Channel Selection Using the PUCCH Format 1b Used in FDD>

If two serving cells using FDD have been configured in UE, ACK/NACK can be transmitted through channel selection that uses the PUCCH format 1b. The UE can feed ACK/NACK for a maximum of 2 transport blocks, received in one serving cell, back to a BS by sending 2-bit (b(0)b(1)) information in one PUCCH resource selected from a plurality of PUCCH resources. One codeword can be transmitted in one transport block. A PUCCH resource can be indicated by a resource index $n^{(1)}_{PUCCH,i}$. Here, A is any one of {2, 3, 4}, and i is 0≤i≤(A−1). The 2-bit information is indicated as b(0)b(1).

HARQ-ACK(j) indicates an HARQ ACK/NACK response that is related to a transport block or DL SPS release PDCCH transmitted by a serving cell. The HARQ-ACK(j), the serving cell, and the transport block can have the following mapping relationship.

TABLE 8

| | HARQ-ACK(j) | | | |
| --- | --- | --- | --- | --- |
| A | HARQ-ACK(0) | HARQ-ACK(1) | HARQ-ACK(2) | HARQ-ACK(3) |
| 2 | Transport block 1 of primary cell | Transport block 2 of secondary cell | NA | NA |
| 3 | Transport block 1 of serving cell 1 | Transport block 2 of serving cell 1 | Transport block 3 of serving cell 2 | NA |
| 4 | Transport block 1 of primary cell | Transport block 2 of primary cell | Transport block 3 of secondary cell | Transport block 4 of secondary cell |

In Table 8, for example, in the case of A=4, HARQ-ACK(0) and HARQ-ACK(1) indicate ACK/NACKs for 2 transport blocks transmitted in a primary cell, and HARQ-ACK(2) and HARQ-ACK(3) indicate ACK/NACKs for 2 transport blocks transmitted in a secondary cell.

When UE receives a PDSCH or detects a DL SPS release PDCCH by detecting a PDCCH in a subframe 'n−4' of a primary cell, the UE sends ACK/NACK using a PUCCH resource $n^{(1)}_{PUCCH,i}$. Here, $n^{(1)}_{PUCCH,i}$ is determined to be $n_{CCE,i}+N^{(1)}_{PUCCH}$. Here, $n_{CCE,i}$ means an index of the first CCE that is used to send a PDCCH by a BS, and $N^{(1)}_{PUCCH}$ is a value set through a higher layer signal. If a transmission mode of a primary cell supports up to two transport blocks, a PUCCH resource $n^{(1)}_{PUCCH,i+1}$ is given. Here, $n^{(1)}_{PUCCH,i+1}$ can be determined to be $n_{CCE,i}+1+N^{(1)}_{PUCCH}$. That is, if a primary cell is set in a transmission mode in which a maximum of up to 2 transport blocks can be transmitted, 2 PUCCH resources can be determined.

If a PDCCH detected in a subframe 'n−4' of a primary cell is not present, a PUCCH resources $n^{(1)}_{PUCCH,i}$ for sending ACK/NACK for a PDSCH is determined by a higher layer configuration. If up to 2 transport blocks are supported, a PUCCH resource $n^{(1)}_{PUCCH,i+1}$ can be given as $n^{(1)}_{PUCCH,i+1}=n^{(1)}_{PUCCH,i+1}$.

If a PDSCH is received in a secondary cell by detecting a PDCCH in a subframe 'n−4', PUCCH resources $n^{(1)}_{PUCCH,i}$ and $n^{(1)}_{PUCCH,i+1}$ for a transmission mode in which up to 2 transport blocks are supported can be determined by a higher layer configuration.

Meanwhile, in the prior art, it was a precondition that a plurality of serving cells configured in a UE uses radio frames having the same type. For example, it was a precondition that all of a plurality of serving cells configured in the UE use FDD frames or use TDD frames. In the next-generation wireless communication system, however, different types of radio frames may be used respectively in serving cells.

Figure 13:
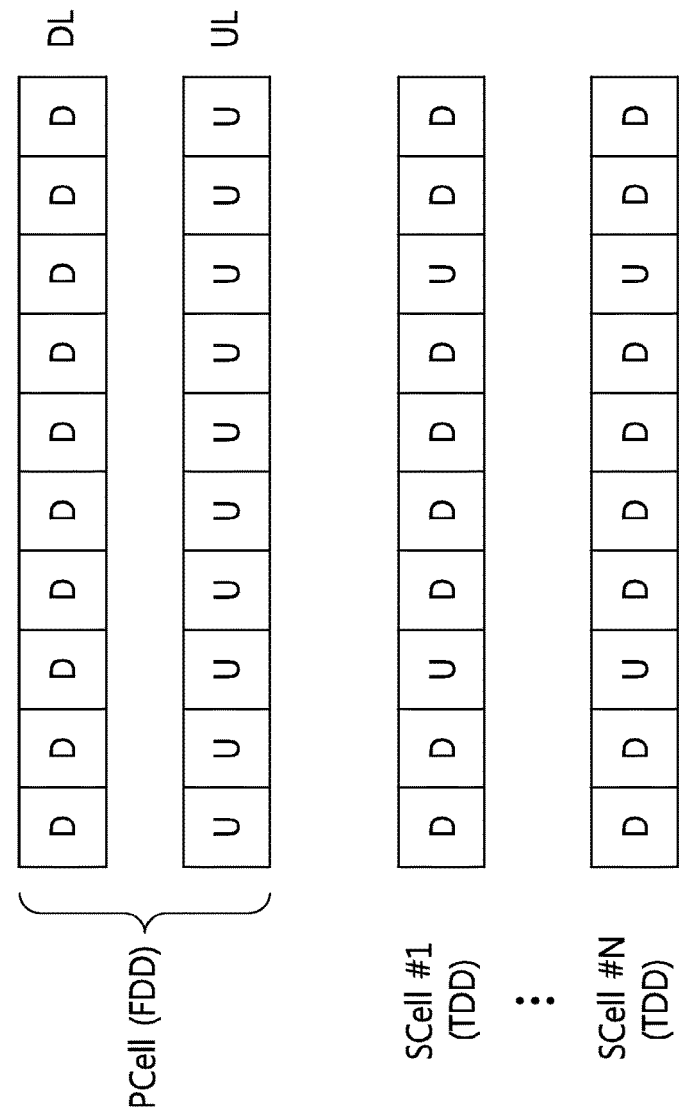
FIG. 13 shows one example in which a plurality of serving cells uses different types of radio frames in a wireless communication system.

FIG. 13 shows one example in which a plurality of serving cells use different types of radio frames in a wireless communication system.

Referring to FIG. 13, a primary cell PCell and a plurality of secondary cells SCell #1, ... , SCell #N may be configured in a UE. In this case, the primary cell may operate in FDD and use an FDD frame, and the secondary cells may operate in TDD and use TDD frames. The same UL-DL configuration may be used in the plurality of secondary cells. A DL subframe (indicated by D) and a UL subframe (indicated by U) are present in a 1:1 manner in the primary cell, but a DL subframe and a UL subframe may be present in a different ratio other than 1:1 in the secondary cells.

Table 9 below shows that ACK/NACK is transmitted in what a subframe according to a UL-DL configuration when one serving cell operates in TDD. Table 9 is equivalent to Table 5.

TABLE 9

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | | 4 | 6 | — | | | |
| 1 | 7 | 6 | | 4 | 7 | 6 | | | | 4 |
| 2 | 7 | 6 | 4 | 8 | 7 | 6 | | 4 | 8 | |
| 3 | 4 | 11 | | | | 7 | 6 | <u>6</u> | <u>5</u> | <u>5</u> |
| 4 | 12 | 11 | | | 8 | 7 | <u>7</u> | <u>6</u> | <u>5</u> | 4 |
| 5 | 12 | 11 | 9 | 8 | 7 | 6 | 5 | 4 | 13 | |
| 6 | <u>7</u> | <u>7</u> | | | | 7 | <u>7</u> | | | <u>5</u> |

In Table 9, when a UE receives a PDSCH or a PDCCH (e.g., DL SPS release PDCCH) necessary for an ACK/NACK response in a subframe n, the UE sends ACK/NACK in a subframe n+k(n). Each of the values of Table 9 indicates the k(n) value. For example, Table 9 indicates that if a UL-DL configuration is 0 and a PDSCH is received in a subframe 0, ACK/NACK is transmitted after four subframes elapse, i.e., in a subframe 4. A specific time is necessary in order for the UE to send ACK/NACK after receiving a PDSCH or a DL SPS release PDCCH. A minimum value of this specific time is hereinafter indicated as $k_{min}$, and a value of $k_{min}$ may be four subframes. In Table 9, referring to a point of time at which ACK/NACK is transmitted, it can be seen that ACK/NACK is chiefly transmitted in the first UL subframe after $k_{min}$ elapses. However, an underline number in Table 9 does not indicate the first UL subframe after $k_{min}$ elapses, but indicates a UL subframe placed next. This is for preventing ACK/NACK for too many DL subframes from being transmitted in one UL subframe.

Meanwhile, since a UL subframe:DL subframe ratio is always 1:1 in FDD, ACK/NACK timing is determined as shown in the following table.

TABLE 9-1

| Frame Structure | Subframe n | | | | | | | | | |
|---|---|---|---|---|---|---|---|---|---|---|
| | 0 | 1 | 2 | 3 | 4 | 5 | 6 | 7 | 8 | 9 |
| FDD | 4 | 4 | 4 | 4 | 4 | 4 | 4 | 4 | 4 | 4 |

That is, as shown in the above Table, $k(n)=k_{min}=4$ for all subframes.

Meanwhile, in the prior art, it was a precondition that all serving cells use radio frames having the same type, and ACK/NACK transmission timing, that is, HARQ timing, was determined based on this assumption. However, if a plurality of serving cells use different types of radio frames, it is necessary to determine which method will be used to transmit ACK/NACK.

It is hereinafter assumed that a primary cell and at least one secondary cell are configured in a UE in a wireless communication system. It is also assumed that the primary cell uses an FDD frame and the secondary cell uses a TDD frame. Any one of the UL-DL configurations of Table 1 may be used in the TDD frame. Hereinafter, only a relationship between a primary cell and one secondary cell is illustrated, for convenience of description, but this relationship may be applied to a relationship between a primary cell and each of a plurality of secondary cells when the plurality of secondary cells are configured in the UE.

Under this assumption, first, a method of transmitting ACK/NACK for downlink data received through a primary cell is described below. Hereinafter, the downlink data generally indicates a PDSCH that requests an ACK/NACK response, a codeword included in a PDSCH, a DL SPS release PDCCH indicating a DL SPS release and the like.

Figure 14:
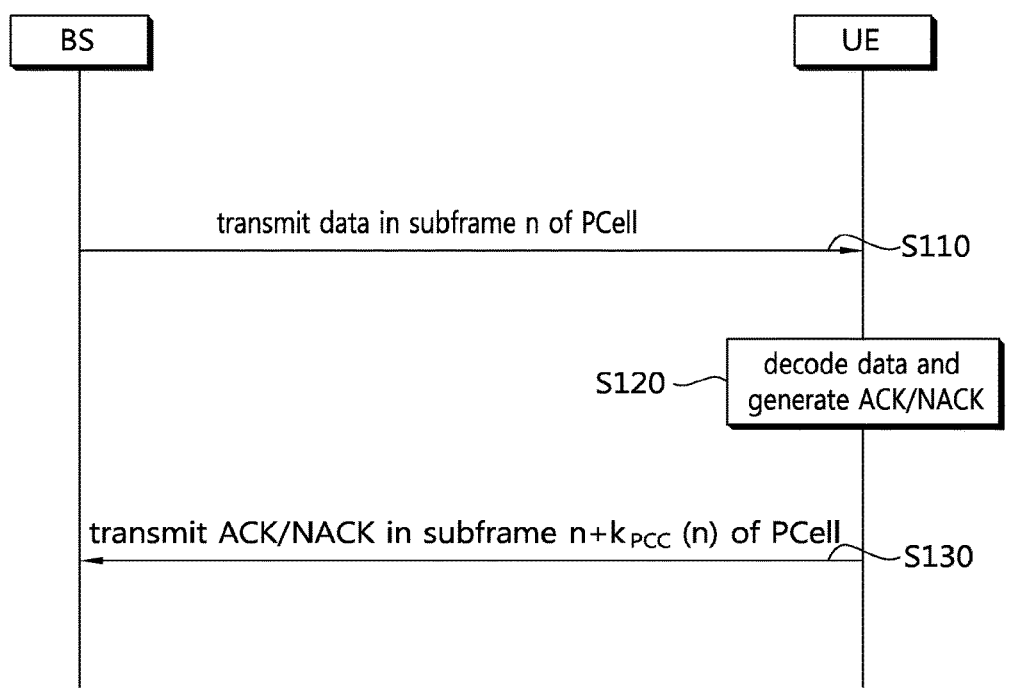
FIG. 14 shows a method of transmitting ACK/NACK for downlink data received through a primary cell.

FIG. 14 shows a method of transmitting ACK/NACK for downlink data received through a primary cell.

Referring to FIG. 14, a BS sends downlink data in a subframe n of a primary cell (S110). From a view of a UE, the downlink data is received in a subframe n of a DL PCC of the primary cell.

The UE decodes the downlink data and generates ACK/NACK for the downlink data (S120).

The UE sends the ACK/NACK in a subframe $n+k_{PCC}(n)$ of the primary cell (S130).

The subframe $n+k_{PCC}(n)$ of the primary cell is a subframe after a minimum delay time (this is called $k_{min}$) necessary for an ACK/NACK response has elapsed from a point of time at which the downlink data was received. Here, the minimum delay time $k_{min}$ may be four subframes. Accordingly, the UE may send the ACK/NACK in a subframe n+4 of a UL PCC of the primary cell.

That is, in the primary cell, as in the case where an HARQ is performed in conventional FDD, the ACK/NACK is transmitted in a subframe after four subframes elapse from a subframe in which data was received.

Now, a method of sending ACK/NACK when a UE receives downlink data in a secondary cell is described.

Figure 15:
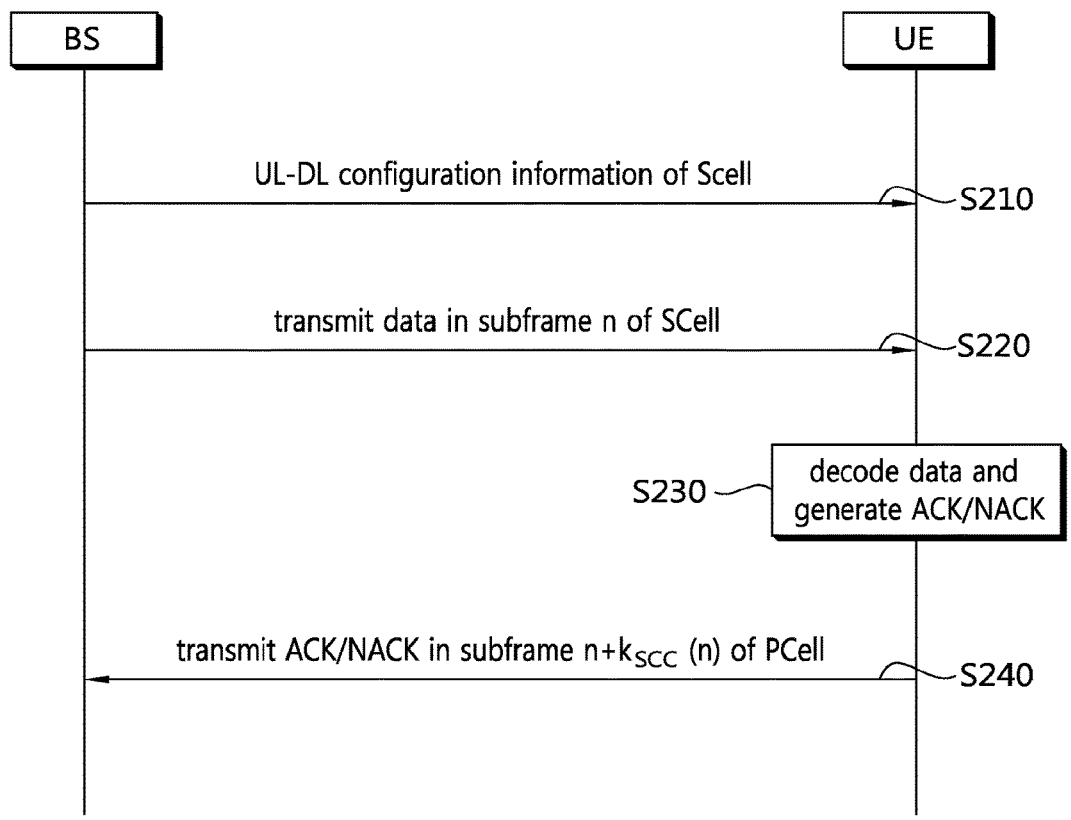
FIG. 15 shows a method of transmitting ACK/NACK for downlink data received through a secondary cell.

FIG. 15 shows a method of transmitting ACK/NACK for downlink data received through a secondary cell.

Referring to FIG. 15, a BS sends information about a UL-DL configuration of the secondary cell (S210). The secondary cell may need the UL-DL configuration information because it operates in TDD. The UL-DL configuration information may be transmitted through a higher layer signal, such as an RRC message.

A BS sends downlink data in a subframe n of the secondary cell (S220).

The UE decodes the downlink data and generates ACK/NACK for the downlink data (S230).

The UE may send the ACK/NACK to the BS through a subframe $n+k_{SCC}(n)$ of a primary cell (S240). The subframe $n+k_{SCC}(n)$ may be determined by the following method.

<HARQ ACK/NACK Transmission Timing in System in which CCs Using Different Frame Structures are Aggregated>

<Method 1>

Method 1 is a method in which a subframe $n+k_{SCC}(n)$ complies with ACK/NACK transmission timing in a primary cell. That is, Method 1 is a method of configuring a UL subframe of the primary cell equal to $n+k_{min}$ as the subframe $n+k_{SCC}(n)$. In other words, if data is received in a subframe n of a secondary cell, ACK/NACK for the data is transmitted in the subframe $n+k_{min}$ of the primary cell. Here, $k_{min}$ may be, for example, four subframes.

Figure 16:
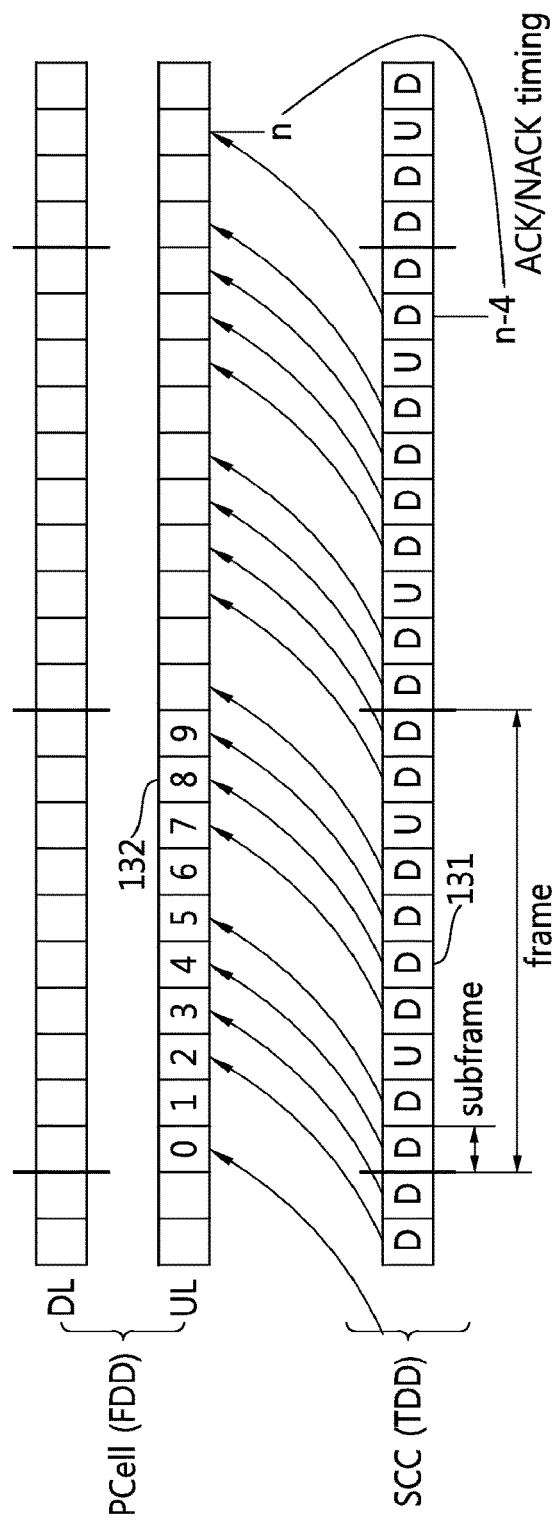
FIG. 16 shows an example of ACK/NACK transmission timing when a primary cell is an FDD cell and a secondary cell is a TDD cell.

FIG. 16 shows an example of ACK/NACK transmission timing when a primary cell is an FDD cell and a secondary cell is a TDD cell.

Referring to FIG. 16, it is assumed that a UL subframe of PCC in which ACK/NACK is transmitted for a DL data channel or DL control channel received in a DL subframe n of PCC is a subframe n+$k_{PCC}$(n). In case of FDD, to avoid an ACK/NACK transmission delay, it may be set to $k_{PCC}$(n)=$k_{min}$=4 similarly in the conventional way.

It is assumed that a UL subframe of PCC in which ACK/NACK is transmitted for a DL data channel or DL control channel received in a DL subframe n of SCC is a subframe n+$k_{SCC}$(n). Then, $k_{SCC}$(n) may comply with ACK/NACK timing of FDD configured in PCC. That is, it may be set to $k_{SCC}$(n)=$k_{min}$=4. For example, ACK/NACK for a DL data channel or DL control channel received in a subframe n 131 of SCC is transmitted in a subframe n+4 132 of PCC.

Figure 17:
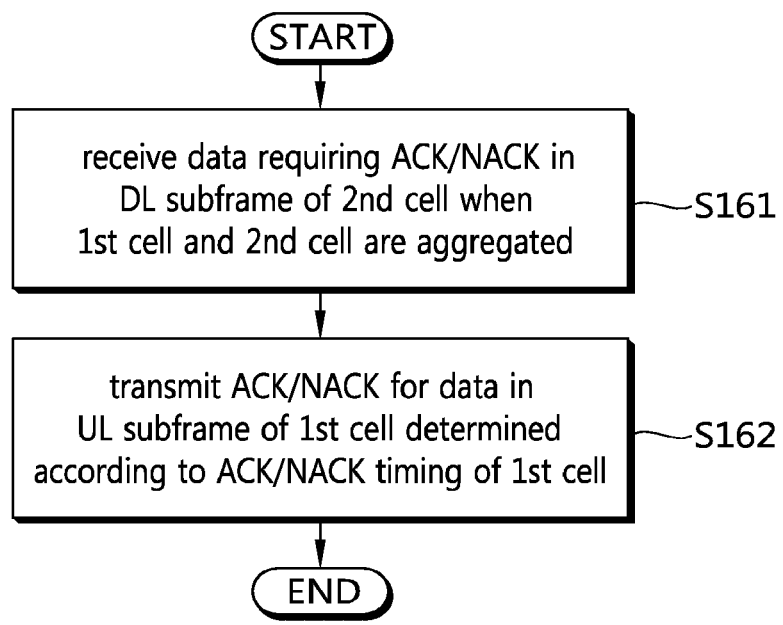
FIG. 17 shows an ACK/NACK transmission method based on Method 1.

FIG. 17 shows an ACK/NACK transmission method based on Method 1.

Referring to FIG. 17, in a situation where a 1$^{st}$ cell and a 2$^{nd}$ cell are aggregated, data requiring ACK/NACK is received in a DL subframe of the 2$^{nd}$ cell (S161). Herein, the data requiring ACK/NACK collectively refers to data requiring an ACK/NACK response such as a PDSCH, a transport block, and a DL SPS release PDCCH. The 1$^{st}$ cell is an FDD cell using an FDD frame, and may be a primary cell. The 2$^{nd}$ cell is a TDD cell using a TDD frame, and may be a secondary cell.

A UE transmits ACK/NACK for the data in a UL subframe of the 1$^{st}$ cell determined according to ACK/NACK timing of the 1$^{st}$ cell (S162).

In accordance with Method 1, there is an advantage in that ACK/NACK delay is minimized because ACK/NACK for downlink data received in the secondary cell is always transmitted after $k_{min}$ subframes elapse on the basis of a point of time at which the downlink data was received.

Furthermore, in conventional TDD, if the number of DL subframes associated with one UL subframe is many, there is a problem in that the number of ACK/NACKs that must be transmitted in the one UL subframe is increased. However, Method 1 is advantageous in that ACK/NACK transmission is distributed.

If the UL subframe of a primary cell in which ACK/NACK is transmitted is a subframe n, the number of ACK/NACK resources that need to be secured in the subframe n may be determined by a transmission mode of the primary cell for a subframe n-$k_{min}$ and a transmission mode in a DL subframe of the secondary cell.

In accordance with Method 1, ACK/NACK timing applied to the UE may be represented by changing Table 5 into Table 10 below.

TABLE 10

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | — | — | — | 4 | 4 | — | — | — | 4 |
| 1 | 4 | — | — | 4 | 4 | 4 | — | — | 4 | 4 |
| 2 | 4 | — | 4 | 4 | 4 | 4 | — | 4 | 4 | 4 |
| 3 | 4 | 4 | 4 | 4 | 4 | 4 | — | — | — | 4 |
| 4 | 4 | 4 | 4 | 4 | 4 | 4 | — | — | 4 | 4 |
| 5 | 4 | 4 | 4 | 4 | 4 | 4 | — | 4 | 4 | 4 |
| 6 | 4 | — | 4 | 4 | 4 | — | — | — | — | 4 |

That is, if a UL-DL configuration of the secondary cell is the same as any one of Table 10 and the primary cell uses an FDD frame, a subframe n is a subframe in which ACK/NACK is transmitted and a number indicated in the subframe n indicates $k_{min}$. Herein, the subframe n-$k_{min}$ indicates a subframe in which downlink data, that is, the subject of ACK/NACK, is received. For example, in Table 10, a UL-DL configuration is 0, and 4 is written in a subframe 9. In this case, it indicates that ACK/NACK for downlink data received in the subframe 5 (=9−4) of the secondary cell is transmitted in the subframe 9.

In accordance with Method 1, ACK/NACK timing applied to the UE may be represented by changing Table 9 into Table 11 below.

TABLE 11

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | — | | 4 | 4 | — | | | |
| 1 | 4 | 4 | | 4 | 4 | 4 | | | 4 | 4 |
| 2 | 4 | 4 | 4 | 4 | 4 | 4 | 4 | 4 | 4 | 4 |
| 3 | 4 | 4 | | | 4 | 4 | 4 | 4 | 4 | 4 |
| 4 | 4 | 4 | | 4 | 4 | 4 | 4 | 4 | 4 | 4 |
| 5 | 4 | 4 | 4 | 4 | 4 | 4 | 4 | 4 | 4 | 4 |
| 6 | 4 | 4 | | 4 | 4 | 4 | | | | 4 |

In Table 11, a subframe n indicates a subframe in which downlink data is received. A subframe n+$k_{SCC}$(n) is a subframe in which ACK/NACK for the downlink data is transmitted. Each of values in Table 11 indicates a $k_{SCC}$(n) value for the subframe n. For example, it indicates that, if a UL-DL configuration is 0 and downlink data is received in the subframe 1 of a secondary cell, ACK/NACK is transmitted in a subframe 5 (of a primary cell) after four subframes elapse.

Tables 10 and 11 and FIG. 13 have a precondition that the radio frame boundaries of a secondary cell and a primary cell are the same. That is, it is a precondition that the radio frame of the primary cell is synchronized with the radio frame of the secondary cell. If the radio frame of the primary cell is not synchronized with the radio frame of the secondary cell, additional subframe delay (indicated by $k_{add}$) for compensating for this asynchronization may be taken into consideration. That is, in Method 1, $k_{SCC}$(n) may be changed into $k_{min}$+$k_{add}$.

Or, assuming that downlink data is received in the subframe n of a secondary cell and a subframe in which ACK/NACK for the downlink data is transmitted is n+$k_{SCC}$(n), if the $k_{SCC}$(n) is smaller than $k_{min}$+$k_{add}$, scheduling may be limited so that the downlink data is not transmitted in the subframe n of the secondary cell.

<Method 2>

Method 2 is a method of determining a subframe n+$k_{SCC}$(n) in which ACK/NACK is transmitted based on TDD ACK/NACK transmission timing in a secondary cell. That is, $k_{SCC}$(n) is determined as in Table 9, but actual ACK/NACK is transmitted through the UL PCC of a primary cell. In other words, ACK/NACK for a DL data channel or DL control channel received in SCC may be transmitted in a UL subframe of PCC according to ACK/NACK timing configured in SCC.

Figure 18:
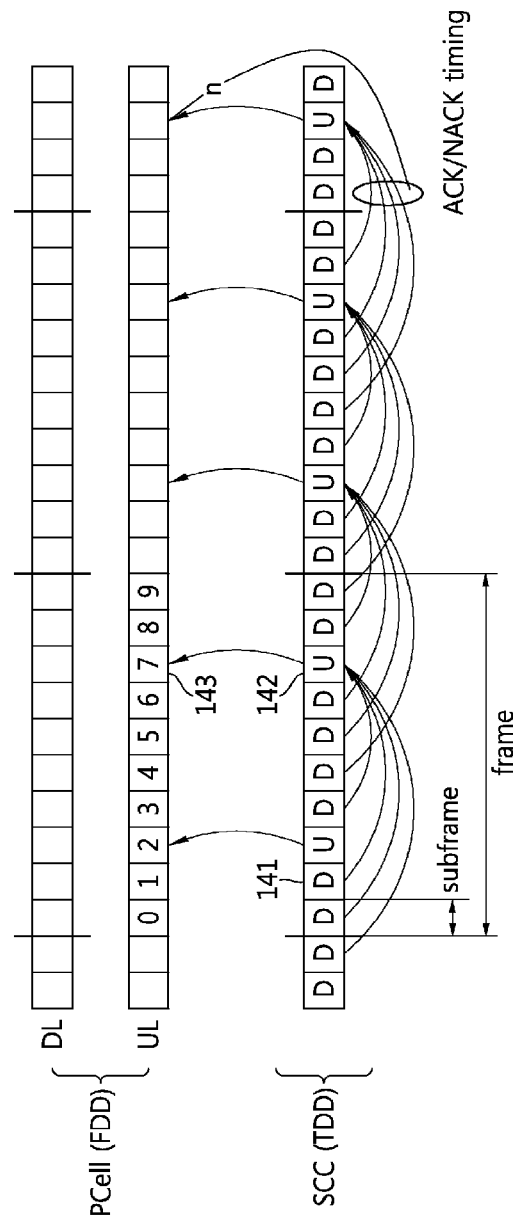
FIG. 18 shows another example of ACK/NACK transmission timing when a primary cell is an FDD cell and a secondary cell is a TDD cell.

FIG. 18 shows another example of ACK/NACK transmission timing when a primary cell is an FDD cell and a secondary cell is a TDD cell.

Referring to FIG. 18, it is assumed that a UL subframe of PCC in which ACK/NACK is transmitted for a DL data channel or DL control channel received in a DL subframe n of PCC is a subframe n+$k_{PCC}$(n). In case of FDD, to avoid an ACK/NACK transmission delay, it may be set to $k_{PCC}(n)=k_{min}=4$ similarly in the conventional way.

In this case, ACK/NACK for a DL data channel or DL control channel received in a DL subframe n 141 of SCC may be transmitted in a UL subframe n+k(n) 142 of SCC when ACK/NACK timing configured in SCC is applied. In this case, the ACK/NACK is transmitted in a UL subframe 143 of PCC at a time equal to that of the UL subframe n+k(n) 142.

Figure 19:
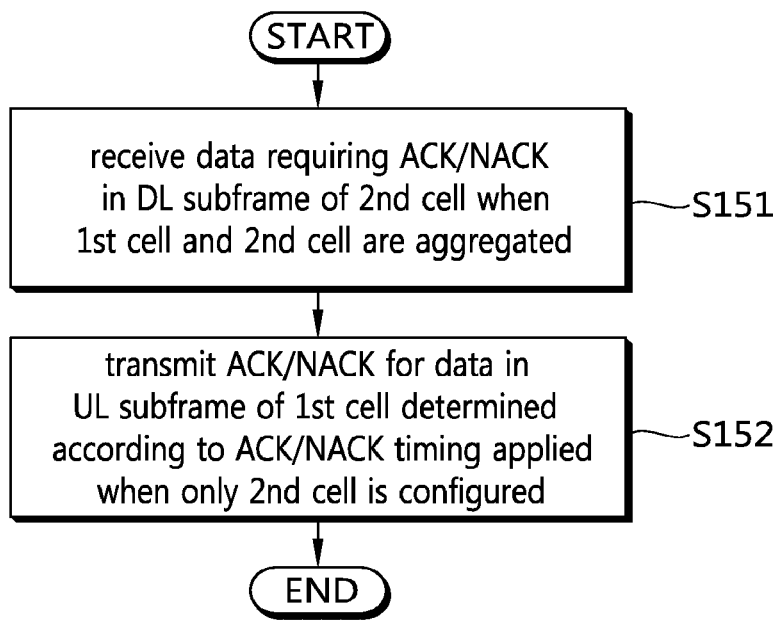
FIG. 19 shows an ACK/NACK transmission method based on Method 2.

FIG. 19 shows an ACK/NACK transmission method based on Method 2.

Referring to FIG. 19, in a situation where a $1^{st}$ cell and a $2^{nd}$ cell are aggregated, data requiring ACK/NACK is received in a DL subframe of the $2^{nd}$ cell (S151). Herein, the data requiring ACK/NACK refers to data requiring an ACK/NACK response such as a PDSCH, a transport block, and a DL SPS release PDCCH. The $1^{st}$ cell is an FDD cell using an FDD frame, and may be a primary cell. The $2^{nd}$ cell is a TDD cell using a TDD frame, and may be a secondary cell.

A UE transmits ACK/NACK for the data in a UL subframe of the $1^{st}$ cell determined according to ACK/NACK timing applied when only the $2^{nd}$ cell is configured (S152).

Such a method has an advantage in that ACK/NACK timing for TDD CC may be equally applied irrespective of whether the TDD CC is used as a primary cell or secondary cell.

The number of resources for ACK/NACK transmission, which must be ensured in a UL subframe of PCC, is determined according to whether a DL subframe is present in a PCC/SCC at a subframe n and according to a transmission mode at the present DL subframe.

If the radio frame of a primary cell is not synchronized with that of a secondary cell, additional subframe delay (indicated by $k_{add}$) for compensating for this asynchronization may be taken into consideration. The $k_{add}$ may be a fixed value or may be a value set through an RRC message. In Method 2, assuming that $k'_{SCC}(n)=k_{SCC}(n)+k_{add}$, ACK/NACK for downlink data received in the subframe n of the secondary cell may be represented as being transmitting in the UL subframe $n+k'_{SCC}(n)$ of the primary cell.

Or, assuming that downlink data is received in the subframe n of the secondary cell and a subframe in which ACK/NACK for the downlink data is transmitted is $n+k_{SCC}(n)$, if the $k_{SCC}(n)$ is smaller than $k_{min}+k_{add}$, scheduling may be limited so that the downlink data is not transmitted in the subframe n of the secondary cell.

If Method 1 is used as the method of transmitting ACK/NACK in a primary cell and the method of transmitting ACK/NACK for a secondary cell, the ACK/NACK for the primary cell and the secondary cell may comply with an ACK/NACK transmission scheme used in FDD. For example, channel selection may be used in which the PUCCH format 1b used in FDD is used when a plurality of serving cells are configured in a UE. That is, ACK/NACK for the secondary cell is transmitted using channel selection that uses the PUCCH format 1b through the primary cell without using a compression scheme, such as ACK/NACK bundling. A compression scheme, such as ACK/NACK bundling, may not be used because only one DL subframe is associated with one UL subframe of the primary cell.

In contrast, if Method 2 is used as the method of transmitting ACK/NACK in a primary cell and the method of transmitting ACK/NACK for a secondary cell, the ACK/NACK for the primary cell and the secondary cell may comply with an ACK/NACK transmission scheme used in TDD. For example, ACK/NACK may be transmitted through channel selection that uses the PUCCH format 1b used when a plurality of serving cells are configured in TDD.

Whether to apply the aforementioned Methods 1 and 2 may be determined according to whether to use cross carrier scheduling or non-cross carrier scheduling. For example, Method 1 may be used in the cross carrier scheduling and Method 2 may be used in the non-cross carrier scheduling.

If CCs to be aggregated use different frame structures (an aggregation of an FDD CC and a TDD CC), one CC may perform UL transmission and another CC may perform DL reception in the same time duration (or subframe). In this case, the UL transmission may have an effect on the DL reception. Therefore, it is not desirable to perform the UL transmission and the DL reception simultaneously in contiguous frequency bands.

To solve this problem, preferably, frequency bands separated enough not to be interfered from each other are grouped, so that the same UL-DL configuration is used in one group and different UL-DL configurations are used in different groups.

For example, if CCs #1 to #5 are aggregated in an ascending order of an allocated frequency band, the CCs #1 and #2 are grouped as a first group and the CCs #3 to #5 are grouped as a second group, and all CCs in the first group use a UL-DL configuration 0, and all CCs in the second group use a UL-DL configuration 3. In this case, the CC #2 and the CC #3 may be CCs separated enough not to be interfered from each other. In the above example, a UE may have an independent RF module for each group, and may use a separate power amplifier. The UE may transmit one PUCCH for each group, and in this case, a problem of a peak to average ratio (PAPR) increase does not occur even if a plurality of PUCCHs are transmitted in uplink.

If the PUCCH is transmitted only with PCC, Method 1 may be applied, and if the PUCCH is transmitted in a specific UL CC of a group (of a non-contiguous frequency band) to which the PCC does not belong, ACK/NACK timing transmitted through the PUCCH may comply with ACK/NACK timing corresponding to a DL subframe of the specific UL CC in which the PUCCH is transmitted.

Hereinafter, a DCI format used in a carrier aggregation system using different types of radio frames is described.

In the present invention, a serving cell operating with FDD (i.e., an FDD cell) and a serving cell operating with TDD (i.e., a TDD cell) may be aggregated. In addition, when cross carrier scheduling is applied, a plurality of DCI formats transmitted in one serving cell may schedule the FDD cell and the TDD cell.

As described with reference to FIGS. 6 and 7, even if the same DCI format is used, there is a field to be included or not included according to whether TDD is used or FDD is used, and even if there is a field included irrespective of TDD/FDD, a field of which the number of bits varies depending on which one of TDD/FDD is used may be included. For example, a DAI field may be included only in TDD, an HARQ process number field may have a bit number which is different in TDD/FDD, and a presence/absence of an SRS request field may vary depending on which one of TDD/FDD is used.

In the case of an existing TDD system, since a plurality of DL subframes are associated with one UL subframe, a downlink assignment index (DAI) field of 2 bits is included in a PDCCH on which a downlink grant is carried or a PDCCH on which an uplink grant is carried and then transmitted in order to prevent an ACK/NACK error in the UL subframe.

The DAI included in the PDCCH on which the downlink grant is carried includes information about orders of PDSCHs that are transmitted in the DL subframes corresponding to the UL subframe. The DAI included in the PDCCH on which the uplink grant is carried includes information about the sum of the number of DL subframes associated with the UL subframe and the number of DL SPS release PDCCHs.

Meanwhile, if serving cells operating in TDD are aggregated, a DAI included in a PDCCH on which an uplink grant is carried becomes information capable of determining the size of an ACK/NACK payload that is piggybacked to a PUSCH. For example, information about a maximum value may be obtained from the sum of a total number of PDSCHs that are transmitted in DL subframes associated with one UL subframe and the number of DL SPS release PDCCHs on the basis of each of serving cells aggregated through a DAI that is included in a PDCCH on which an uplink grant is carried. The size of a piggybacked ACK/NACK payload may be determined using the maximum value.

Meanwhile, if serving cells operating in FDD are aggregated, a DAI is not necessary because a DL subframe is associated with a UL subframe in a 1:1 manner.

Meanwhile, the number of DL HARQ processes is 8 in case of FDD, and is up to 16 in case of TDD. Therefore, an HARQ process number field included in a DCI format is 3 bits in case of FDD, and is 4 bits in case of TDD.

In addition, an SRS request field is a field for deriving aperiodic SRS transmission, and is added only to DCI formats 0/1A/4 in case of FDD, whereas is added also to DCI formats 2B/2C/2D in case of TDD other than the DCI formats 0/1A/4.

As described above, in the DCI format, the number of bits, i.e., a bit size, may vary according to whether a cell to be scheduled is a TDD cell or an FDD cell. As such, if a size of a DCI format varies according to whether a serving cell to be scheduled is a TDD cell or an FDD cell, a blind decoding overhead of a UE for detecting the DCI format may be increased.

Figure 20:
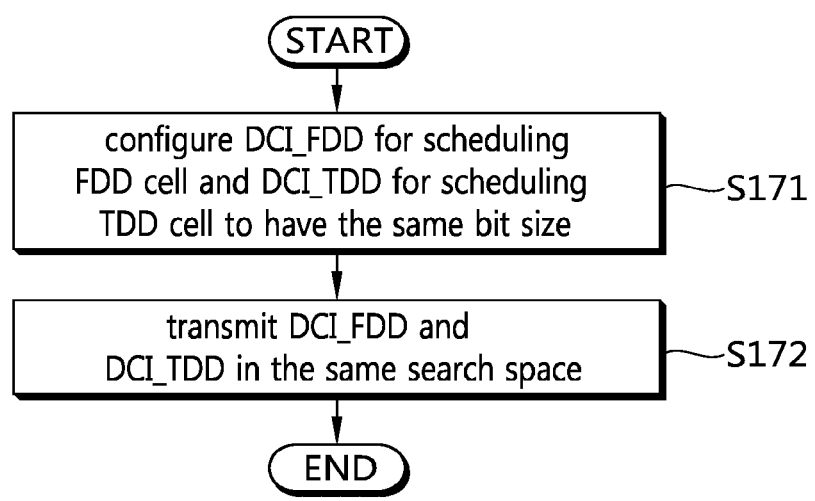
FIG. 20 shows a method of transmitting a DCI format according to an embodiment of the present invention.

FIG. 20 shows a method of transmitting a DCI format according to an embodiment of the present invention.

Referring to FIG. 20, a BS equally sets a bit size of DCI for scheduling an FDD cell (hereinafter, referred to as DCI_FDD) and DCI for scheduling a TDD cell (hereinafter, referred to as DCI_TDD) (S171). The BS may equally set a total bit size of the DCI_FDD and the DCI_TDD, or may equally set a bit size of some fields of the DCI_FDD and the DCI_TDD. The some fields may be a field in which the FDD cell and the TDD cell have different bit sizes or a presence/absence thereof is determined differently when the FDD cell or the TDD cell is used exclusively.

The BS transmits the DCI_FDD and the DCI_TDD in the same search space (S172).

Although the BS may transmit the DCI_FDD and the DCI_TDD in the same search space, e.g., a common search space, the present invention is not necessarily limited thereto. That is, the DCI_FDD and the DCI_TDD may also be transmitted in different search spaces.

Hereinafter, methods for equally setting a total bit size or a bit size of some fields of DCI_FDD and DCI_TDD will be described in detail.

<DAI Field>

1. The DAI field is added to DCI(DCI_FDD) for scheduling a serving cell operating with FDD (configured with an FDD frame structure).

The DAI field may also be added to DCI(DCI_FDD) for scheduling a serving cell operating with FDD. This may be applied, for example, when an FDD secondary cell is aggregated to a TDD primary cell. In this case, ACK/NACK for a DL data/control channel received in the FDD secondary cell may be transmitted in the TDD primary cell, and transmission timing of the ACK/NACK complies with ACK/NACK transmission timing of the TDD primary cell. Then, although the FDD secondary cell is an FDD cell, when complying with the ACK/NACK timing, it may lead to a result in which a plurality of DL subframes may be linked to one UL subframe similarly to the TDD cell.

If a serving cell operating with FDD and a serving cell operating with TDD have a constant size of a frequency band, a size of the same DCI format for scheduling the two serving cells may be equally adjusted. In this case, a UE may use the same searching space to search for a PDCCH even if a different type of a radio frame is used for each serving cell. If the DCI_TDD and the size are not identical even if the DAI field is added to the DCI_FDD (for example, the DCI format size may differ because a frequency band is different in size between the two cells), padding bits may be added to have the same size as the DCI_TDD.

Alternatively, the DAI field may be added only to some of DCIs for scheduling the serving cell operating with FDD. For example, the DAI field may be added only to the DCI formats 0/1A supporting the most basic operation. Alternatively, if the FDD cell is a primary cell, in the DCI formats 0/1A transmitted through a common search space (CSS), transmission may be performed without the DAI field. On the other hand, if the TDD cell is the primary cell, the DAI field may be added only to DCI formats transmitted through the CSS.

Meanwhile, the DAI field added to the DAI_FDD may be utilized for a usage other than an original usage. Although a uplink grant (DCI_FDD) for scheduling a primary cell operating with FDD does not have an original DAI field, if the DAI is included in the DCI_FDD, it may be used as follows. For example, the DL DAI may be used for a virtual CRC (set to a predetermined specific value, e.g., 0), or may be used for various usages such as designation of an ACK/NACK transmission format, whether ACK/NACK transmission is interrupted/accepted, configuration of an ACK/NACK delay value, indication of the total number of DL cells scheduled simultaneously, a counter (sequence value) of DL cells scheduled simultaneously, etc. The UL DAI may be utilized for the usages listed in the DL DAI, or may be used for an original usage of the UL DAI. That is, information necessary when ACK/NACK is piggybacked through a PUSCH may be carried like in TDD. This may be applied to an FDD primary cell when Method 2 is used. According to Method 2, M (M>2) DL subframes may be linked to one UL subframe, and thus DAI transmission may be necessary. That is, if ACK/NACK is transmitted according to ACK/NACK timing of a TDD cell like in Method 2, the DAI may be included in the DAI_FDD.

2. The DAI field is removed in DCI for scheduling a serving cell operating with TDD (configured with a TDD frame type).

A DAI is conventionally present in DCI(DCI_TDD) for scheduling a serving cell operating with TDD, but this DAI field may be removed. Accordingly, when a serving cell operating with FDD and a serving cell operating with TDD have a constant frequency band size, the same DCI formats on which the two serving cells are scheduled may be made to have the same size. In this case, a UE may use the same searching space when searching for a PDCCH even if the UE uses different types of radio frames in the serving cells. If the DCI formats do not have the same size even if the DAI field is added (e.g., for a reason that the frequency bands of the two serving cells do not have the same size), the DCI formats may be made to have the same size by adding padding bits to a DCI format having a smaller size.

Alternatively, a DAI field may be removed only in some of DCIs for scheduling a serving cell operating with TDD. For example, the DAI field may be removed only in DCI formats 0/1A supporting the most basic operation.

Alternatively, the DAI field may be removed only in DCI formats transmitted through a common search space (CSS).

Such a method may be applied to Method 1 above. According to Method 1, ACK/NACK transmission timing conforms to an FDD cell. For example, a primary cell may be the FDD cell, and a secondary cell may be a TDD cell. In this case, ACK/NACK for data received in the TDD cell is transmitted in the FDD cell, and transmission timing of the ACK/NACK may comply with ACK/NACK transmission timing of the FDD cell. As a result, although the secondary cell is the TDD cell, only one DL subframe may be linked to one UL subframe on ACK/NACK timing similarly to the FDD cell. In other words, even if the secondary cell is the TDD cell, only one DL subframe of the secondary cell in association with a UL subframe for transmitting ACK/NACK is defined. Accordingly, the DCI_TDD may not require the DAI.

In summary, both of the DCI_FDD and the DCI_TDD may include a downlink assignment index (DAI) having the same number of bits, or both of them may not include the DAI.

<HARQ Process Number Field>

1. A 4-bit HARQ process number field is applied to a DCI format for scheduling an FDD cell (i.e., DCI_FDD).

Conventionally, a 3-bit HARQ process number field is applied to the DCI_FDD. However, the 4-bit HARQ process number field is applied herein similarly to the DCI_TDD. Accordingly, the DCI_FDD and the DCI_TDD may be adjusted to have the same size.

In this case, a UE may use the same searching space when searching for a PDCCH even if the UE uses different types of radio frames in the serving cells. If the DCI formats do not have the same size even if a DAI field is added (e.g., the DCI formats may not have the same size because frequency bands between the two serving cells differ), the DCI formats may be made to have the same size by adding padding bits.

In this case, a 4-bit field may be applied only to some of DCIs for scheduling a serving cell operating with FDD. For example, the 4-bit field may be applied only to the DCI formats 0/1A supporting the most basic operation.

In this case, a 3-bit field may be applied to DCI formats transmitted through a common search space (CSS).

Such a method may be applied to Method 2 in which the ACK/NACK transmission timing conforms to a UL-DL configuration of a TDD cell. If the TDD cell is a primary cell and an FDD cell is a secondary cell, Method 2 may be applied to the FDD secondary cell. In this case, the maximum number of HARQ processes of the FDD secondary cell may be greater than or equal to 8. Accordingly, there is a need to use a 4-bit HARQ process number field. If additional ACK/NACK timing is applied in addition to the TDD ACK/NACK timing and thus the number of HARQ processes exceeds 16, a 5-bit HARQ process number field may be used. Alternatively, the 4-bit HARQ process number field may be used, and may be ignored when an HARQ process number is greater than or equal to 16 (herein, the HARQ process number starts from 0).

Meanwhile, even if the maximum number of HARQ processes is greater than or equal to 8 in the FDD cell, the number of HARQ processes that can be maintained simultaneously in practice on a soft buffer may be limited to 8. In this case, a 3-bit HARQ process number field may be used irrespective of whether ACK/NACK timing applied to the FDD cell conforms to the TDD cell or conforms to the FDD cell.

2. A 3-bit HARQ process number field is applied to DCI for scheduling a serving cell operating with TDD.

Conventionally, a 4-bit HARQ process number field is applied to the DCI_TDD. However, the 3-bit HARQ process number field is applied herein similarly to the DCI_FDD. Accordingly, the DCI_FDD and the DCI_TDD may be adjusted to have the same size.

In this case, a UE may use the same searching space when searching for a PDCCH even if the UE uses different types of radio frames in the serving cells. If the DCI formats do not have the same size even if a DAI field is added (e.g., the DCI formats may not have the same size because frequency bands between the two serving cells differ), the DCI formats may be made to have the same size by adding padding bits.

Such a method may be applied to Method 1. According to the Method 1, ACK/NACK transmission timing for the TDD cell conforms to the FDD cell. In a case where a primary cell is the FDD cell and a secondary cell is the TDD cell or if the primary cell is the TDD cell and the secondary cell is the FDD cell, if the ACK/NACK transmission timing conforms to the FDD cell, the maximum number of HARQ processes is less than or equal to 8 in the secondary cell in most cases. Accordingly, it is permissible that the HARQ process number field is 3 bits. If the number of HARQ processes exceeds 8, the 4-bit HARQ process number field may be applied, or the 3-bit HARQ process number field may be used while ignoring a case where an HARQ process number is great than or equal to 8.

<SRS Request Field>

The conventional SRS request field may be included in DCI formats 0/1A/2B/2C/2D/4.

The SRS request field may be 0 or 1 bit if it is included in the DCI formats 0/1A/2B/2C/2D. A 1-bit SRS request field is included only for a case where SRS parameters for the DCI formats 0/1A/2B/2C/2D are configured by a higher layer, and otherwise, the SRS request field is 0 bit. In addition, the 1-bit SRS request field is included only for a case where the DCI formats 0/1A are transmitted in a UE-specific search space, and this is irrelevant to TDD/FDD. The 1-bit SRS request field is included only for a case where the DCI formats 2B/2C/2D are transmitted in the UE-specific search space, and this is included only in TDD. An SRS parameter set may be configured independently in the DCI format 0 and the DCI formats 1A/2B/2C.

Meanwhile, a 2-bit SRS request field is transmitted in the DCI format 4. If a value of the 2 bit is '00', an aperiodic SRS is not triggered, and if the value is '01', the aperiodic SRS is triggered for a $1^{st}$ SRS parameter set configured by RRC signaling. If the value is '10', the aperiodic SRS is triggered for a $2^{nd}$ SRS parameter set configured by RRC signaling. If the value is '11', the aperidoic SRS is triggered for a $3^{rd}$ SRS parameter set configured by RRC signaling. The $1^{st}$, $2^{nd}$ and $3^{rd}$ sets are configured independent of SRS parameter sets for a 1-bit SRS request. The DCI format 4 may include the SRS request field irrespective of FDD/TDD.

Such an SRS request field may be applied to DCI as described below in the present invention.

1. The SRS request field is applied to DCI formats 2B/2C/2D for scheduling an FDD cell.

Like in DCI_TDD, if an aperiodic SRS is configured in DCI_FDD, an SRS request field is added to corresponding DCI. For example, the SRS request field may be added to DCI formats 2B/2C/2D for scheduling an FDD cell. Since an uplink is not always open in TDD, it may be necessary to add the SRS request field like in TDD.

If the DCI_TDD and the DCI_FDD have the same size, it is possible to share a search space. If the DCI_FDD does not have the same size as the DCI_TDD even if the SRS request field is added to the DCI_FDD, padding bits may be added to a DCI format having a smaller DCI format.

This method may be applied only when an FDD cell and a TDD cell have the same transmission mode. Alternatively, the method may be applied only when the DCI format is identical. This is because the method may be unnecessary for the following reason. That is, the DCI formats 2B/2C/2D are selected according to the transmission mode, and if the TDD cell and the FDD cell do not have the same transmission mode, an additional transmission mode dependent DCI format other than the DCI format 1A is different, and a length of the format may be different.

Further, this method may be determined according to whether all DL subframes can be utilized in the FDD cell. For example, this may correspond to a case where only a DL subframe corresponding to a TDD UL-DL configuration which is a criterion of using DL subframes can be used in the FDD cell.

2. The SRS request field is removed in DCI formats 2B/2C/2D for scheduling a TDD cell.

Like in FDD, the SRS request field is not additionally applied to corresponding DCI even if an aperiodic SRS is configured. This is because it may be unnecessary to apply an additional SRS request field to a DL DCI format dependent on a transmission mode like in TDD since an uplink of FDD is always open.

If the DCI_TDD and the DCI_FDD have the same size, it is possible to share a search space. If the DCI_TDD does not have the same size as the DCI_FDD even if the SRS request field is added to the DCI_TDD, padding bits may be added to a DCI format having a smaller DCI format.

The removing of the SRS request field from the DCI_TDD may be applied only when an FDD cell and a TDD cell have the same transmission mode. Alternatively, the method may be applied only when the DCI format is identical. This is because the method may be unnecessary for the following reason. That is, the DCI formats 2B/2C/2D are selected according to the transmission mode, and if the transmission mode is not identical, a DCI format dependent on an additional transmission mode other than the DCI format 1A is different, and a length of the format may be different.

Meanwhile, although the DAI field, the HARQ process number field, and the SRS request field are described above for convenience, the present invention is not limited thereto. That is, all of the above three fields may be configured to be equal to each other to make the DCI_TDD and the DCI_FDD have the same size. In addition, technical features of the present invention are apparently applied to other fields of which a presence/absence and the number of bits may vary for each TDD cell/FDD cell.

Figure 21:
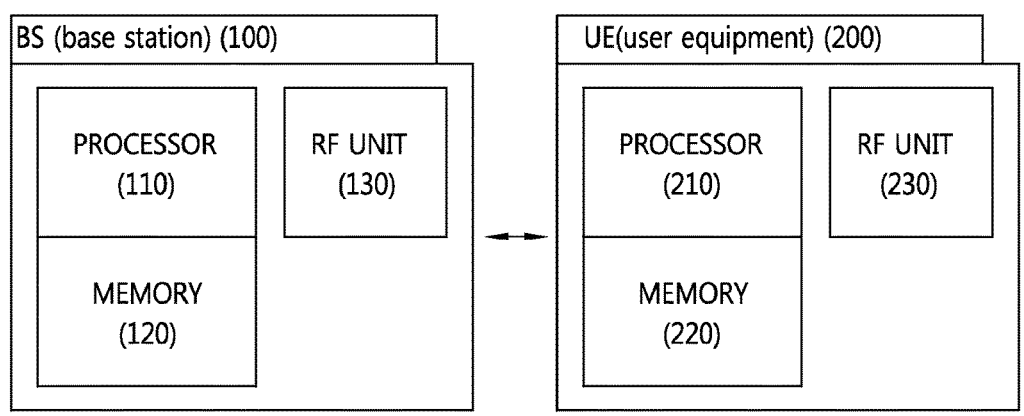
FIG. 21 is a block diagram of a wireless device according to an embodiment of the present invention.

FIG. 21 is a block diagram of a wireless device according to an embodiment of the present invention.

ABS 100 includes a processor 110, a memory 120, and a radio frequency (RF) unit 130. The processor 110 implements the proposed functions, procedure, and/or methods. For example, the processor 110 configures a plurality of serving cells which use different frame structures to a UE. For example, an FDD cell which uses an FDD frame and a TDD cell which uses a TDD cell may be configured.

Thereafter, DCI_FDD for scheduling an FDD cell and DCI_TDD for scheduling a TDD cell may be generated and then be transmitted in the same search space. In this case, the DCI_FDD and the DCI_TDD may be generated to have the same bit size. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, an FDD cell and a TDD cell which use different frame structures may be configured to the processor 210, and the processor 210 may receive DCIs for respective cells. Reception of DCI_FDD and DCI_TDD may be attempted in the same search space, for example, a common search space. The processor 210 may attempt the reception by assuming that the DCI_FDD and the DCI_TDD have the same size. The memory 220 is coupled to the processor 210, and stores a variety of information for driving the processor 210. The RF unit 230 is coupled to the processor 210, and transmits and/or receives a radio signal.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for receiving downlink control information (DCI) in a wireless communication system, the method performed by a user equipment (UE) which is configured with a plurality of serving cells and comprising:
   receiving at least one of DCI for a frequency division duplex (FDD) cell which uses FDD frames (DCI_FDD) and DCI for a time division duplex (TDD) cell which uses TDD frames (DCI_TDD); and
   decoding the at least one of the DCI_FDD and the DCI_TDD,
   wherein when the plurality of serving cells comprise an FDD cell and a TDD cell, a hybrid automatic repeat request (HARQ) process number field in the DCI_FDD and in the DCI_TDD has a same bit size and the same bit size depends on whether a primary cell is an FDD cell or a TDD cell.

2. The method of claim 1,
   wherein the primary cell is an FDD cell in which the UE performs an initial connection establishment procedure or a connection re-establishment procedure with respect to a base station, and
   wherein at least one secondary cell is a TDD cell which is allocated to the UE in addition to the primary cell.

3. The method of claim 2, wherein the DCI_TDD does not include a downlink assignment index (DAI) field when the primary cell is an FDD cell.

4. The method of claim 2, wherein the DCI_TDD includes a 3-bit HARQ process number field when the primary cell is an FDD cell.

5. The method of claim 1,
wherein the primary cell is a TDD cell in which the UE performs an initial connection establishment procedure or a connection re-establishment procedure with respect to a base station, and
wherein at least one secondary cell is an FDD cell which is allocated to the UE in addition to the primary cell.

6. The method of claim 5, wherein the DCI_FDD includes a downlink assignment index (DAI) field when the primary cell is a TDD cell.

7. The method of claim 5, wherein the DCI_FDD includes a 4-bit HARQ process number field when the primary cell is a TDD cell.

8. The method of claim 1, wherein when the plurality of serving cells are all the same type of cell, either FDD cells or TDD cells, the bit size of the HARQ process number field in the DCI_FDD and DCI_TDD depends on whether the plurality of serving cells are FDD cells or TDD cells.

9. A user equipment (UE) comprising:
a transceiver; and
a processor operatively coupled to the transceiver,
wherein the processor controls the transceiver to receive at least one of DCI for a frequency division duplex (FDD) cell which uses FDD frames (DCI_FDD) and DCI for a time division duplex (TDD) cell which uses TDD frames (DCI_TDD), and decodes the DCI_FDD and the DCI_TDD,
wherein when the plurality of serving cells comprise an FDD cell and a TDD cell, a hybrid automatic repeat request (HARQ) process number field in the DCI_FDD and DCI_TDD has a same bit size and the same bit size depends on whether a primary cell is an FDD cell or a TDD cell.

10. The UE of claim 9,
wherein the primary cell is an FDD cell in which the UE performs an initial connection establishment procedure or a connection re-establishment procedure with respect to a base station, and
wherein at least one secondary cell is a TDD cell which is allocated to the UE in addition to the primary cell.

11. The UE of claim 10, wherein the DCI_TDD does not include a downlink assignment index (DAI) field when the primary cell is a TDD cell.

12. The UE of claim 10, wherein the DCI_TDD includes a 3-bit HARQ process number field when the primary cell is a TDD cell.

13. The UE of claim 9,
wherein the primary cell is a TDD cell in which the UE performs an initial connection establishment procedure or a connection re-establishment procedure with respect to a base station, and
wherein at least one secondary cell is an FDD cell which is allocated to the UE in addition to the primary cell.

14. The UE of claim 13, wherein the DCI_FDD includes a downlink assignment index (DAI) field when the primary cell is a TDD cell.

15. The UE of claim 13, wherein the DCI_FDD includes a 4-bit HARQ process number field when the primary cell is a TDD cell.

16. The UE of claim 9, wherein when the plurality of serving cells are all the same type of cell, either FDD cells or TDD cells, the bit size of the HARQ process number field in the DCI_FDD and DCI_TDD depends on whether the plurality of serving cells are FDD cells or TDD cells.

* * * * *